US010716050B2

(12) United States Patent
Parron et al.

(10) Patent No.: US 10,716,050 B2
(45) Date of Patent: Jul. 14, 2020

(54) METHODS AND DEVICES FOR MANAGING PACKET DATA NETWORK CONNECTIONS

(71) Applicant: Intel IP Corporation, Santa Clara, CA (US)

(72) Inventors: Jerome Parron, Fuerth (DE); Alexander Sirotkin, Petach Tikva (IL)

(73) Assignee: Apple Inc., Cupertino, CA (US)

(*) Notice: Subject to any disclaimer, the term of this patent is extended or adjusted under 35 U.S.C. 154(b) by 151 days.

(21) Appl. No.: 16/071,077

(22) PCT Filed: Jan. 20, 2017

(86) PCT No.: PCT/US2017/014210
§ 371 (c)(1),
(2) Date: Jul. 19, 2018

(87) PCT Pub. No.: WO2017/142672
PCT Pub. Date: Aug. 24, 2017

(65) Prior Publication Data
US 2020/0084692 A1 Mar. 12, 2020

(30) Foreign Application Priority Data
Feb. 19, 2016 (DE) .................. 10 2016 102 983

(51) Int. Cl.
H04W 28/08 (2009.01)
H04W 36/24 (2009.01)
(Continued)

(52) U.S. Cl.
CPC ......... H04W 48/06 (2013.01); H04W 28/085 (2013.01); H04W 36/22 (2013.01);
(Continued)

(58) Field of Classification Search
CPC . H04W 76/15; H04W 16/14; H04W 36/0069; H04W 36/22; H04W 36/245;
(Continued)

(56) References Cited

U.S. PATENT DOCUMENTS

2011/0199987 A1 8/2011 Rommer
2012/0315905 A1 12/2012 Zhu et al.
(Continued)

FOREIGN PATENT DOCUMENTS

WO 2015046267 A1 4/2015
WO 2015152872 A1 10/2015

OTHER PUBLICATIONS

German Office Action based on application No. 10 2016 102 983.1 (7 pages) dated Nov. 16, 2016 (Reference Purpose Only).
(Continued)

Primary Examiner — Kent Krueger
(74) Attorney, Agent, or Firm — Kowert, Hood, Munyon, Rankin & Goetzel, P.C.

(57) ABSTRACT

A mobile communication device may include a first modem configured to transmit and receive radio signals on a cellular wide area radio access, a second modem configured to transmit and receive radio signals on a short range radio access, and a connection management circuit configured to monitor radio access transfers of one or more packet data network connection to generate a transfer history database, determine from the transfer history database if excessive previous transfers of the one or more packet data network connections occur between the cellular wide area radio access and the short range radio access, identify an available transfer of a target packet data network connection of the one or more packet data network connections between the first modem and the second modem, and selectively block the available transfer between the first modem and the
(Continued)

second modem based on if excessive previous transfers of the one or more packet data network connections occur between the first modem and the second modem.

20 Claims, 8 Drawing Sheets

(51) Int. Cl.
    *H04W 48/06*     (2009.01)
    *H04W 36/22*     (2009.01)
    *H04W 48/18*     (2009.01)
    *H04W 84/12*     (2009.01)
    *H04W 88/06*     (2009.01)

(52) U.S. Cl.
    CPC ............ *H04W 48/18* (2013.01); *H04W 84/12* (2013.01); *H04W 88/06* (2013.01)

(58) Field of Classification Search
    CPC ... H04W 48/06; H04W 48/18; H04W 28/085; H04W 84/12; H04W 88/06
    See application file for complete search history.

(56) References Cited

U.S. PATENT DOCUMENTS

| | | |
|---|---|---|
| 2014/0228063 A1 | 8/2014 | Harris et al. |
| 2014/0241180 A1 | 8/2014 | Amerga et al. |
| 2015/0038180 A1 | 2/2015 | Quick et al. |
| 2015/0055627 A1 | 2/2015 | Robbins et al. |
| 2015/0103806 A1 | 4/2015 | Kuusilinna et al. |
| 2015/0358868 A1 | 12/2015 | Wegmann |
| 2016/0007260 A1 | 1/2016 | Abraham et al. |
| 2016/0249285 A1 | 8/2016 | Fujishiro |
| 2018/0227815 A1* | 8/2018 | Sharma ................ H04W 88/06 |

OTHER PUBLICATIONS

International Search Report based on application No. PCT/US2017/014210 (12 pages) dated Apr. 26, 2017 (Reference Purpose Only).
3GPP TS 23.402, Architecture enhancements for non-3GPP accesses,(Release 13), 3rd Generation Partnership Project, Technical Specification Group Services and System Aspects, 2015.
Netmanias Technical Document, "LTE IP Address Allocaëon Schemes I: Basic", Feb. 13, 2015.
Anritsu, "Understanding WLAN offload in cellular networks", Sep. 2013.

* cited by examiner

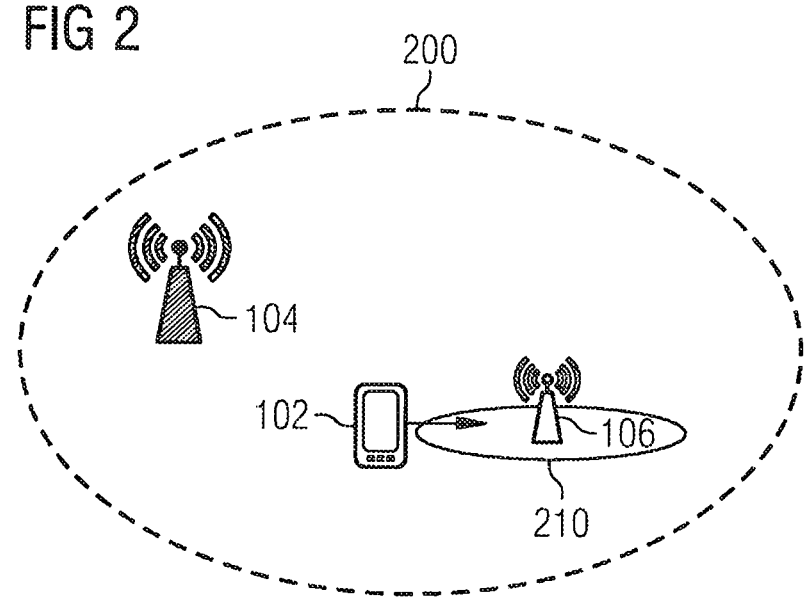
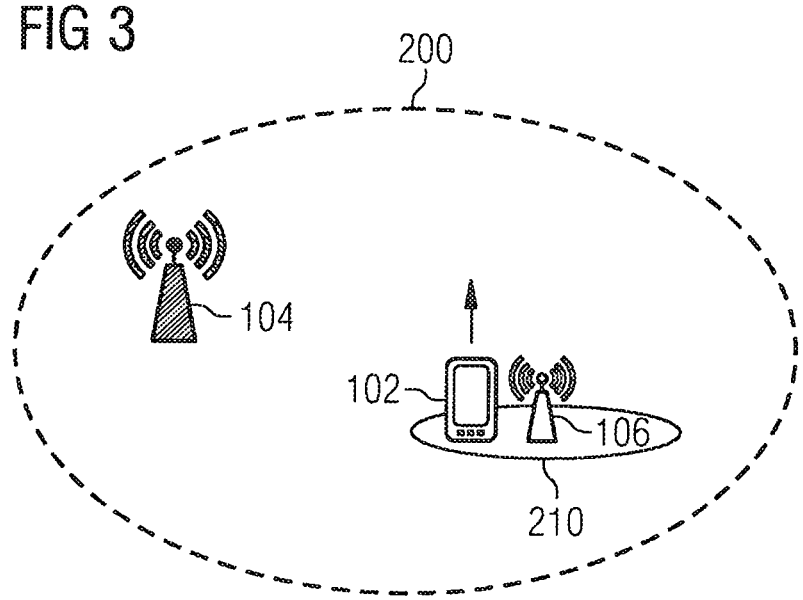

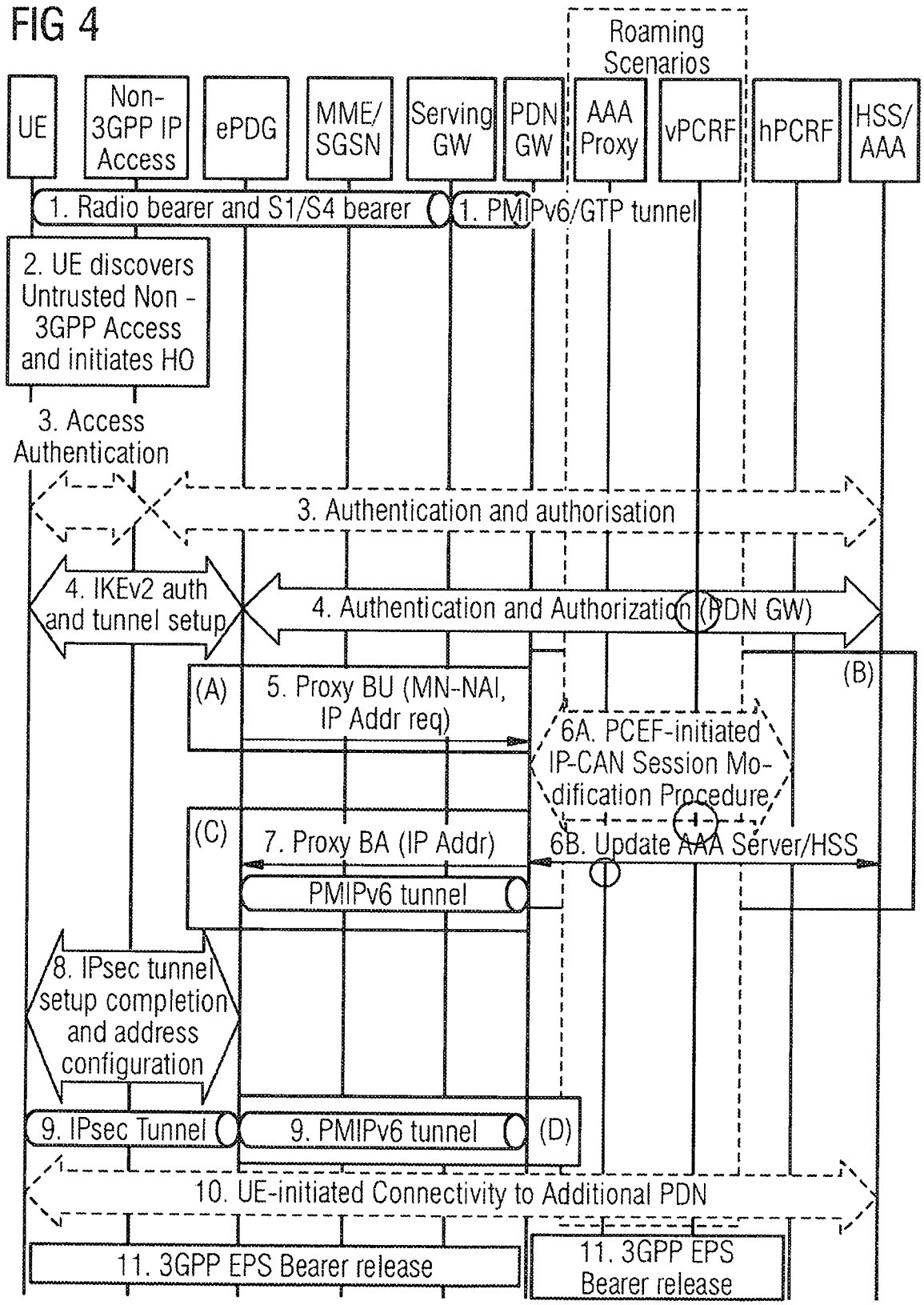

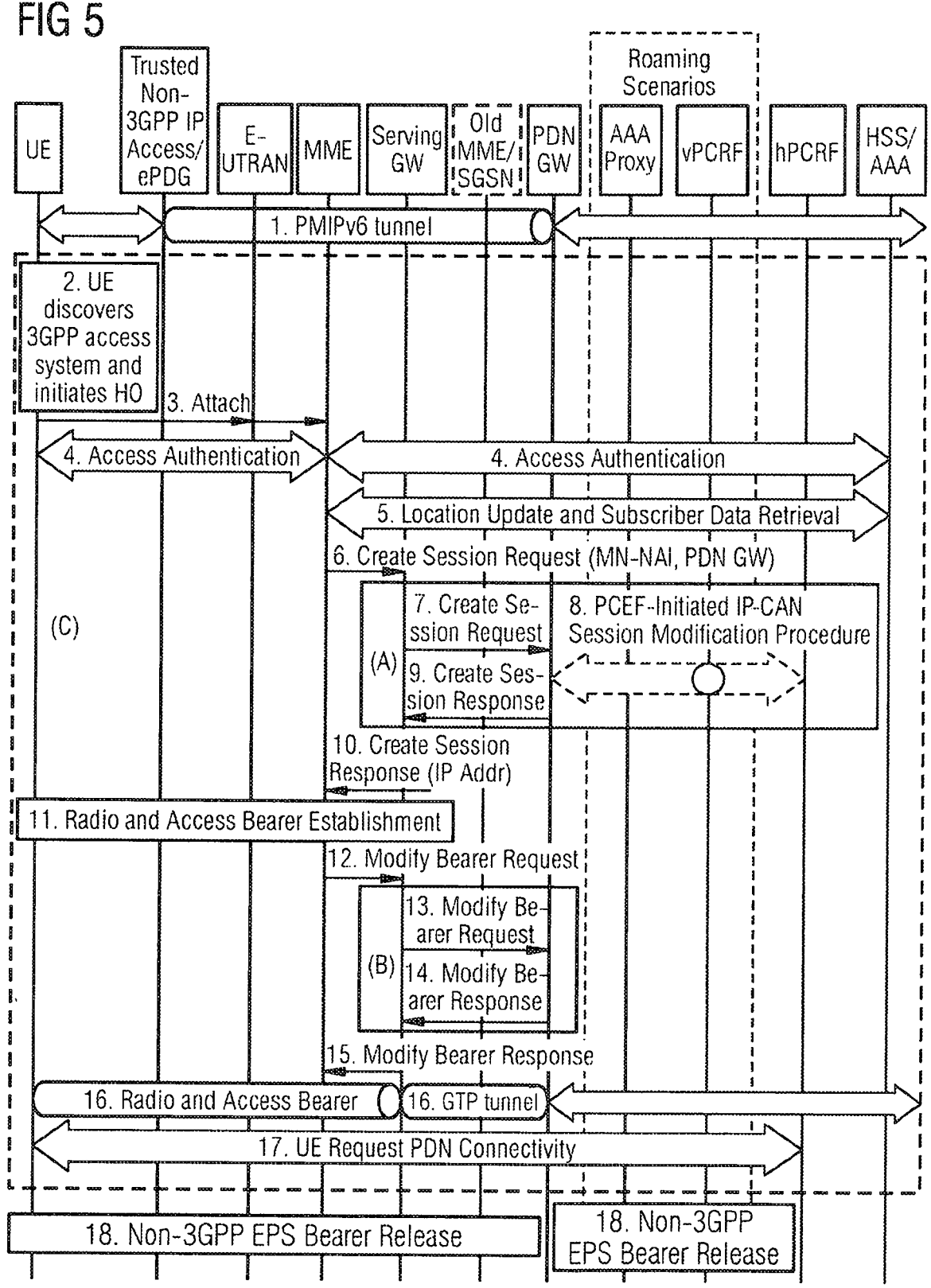

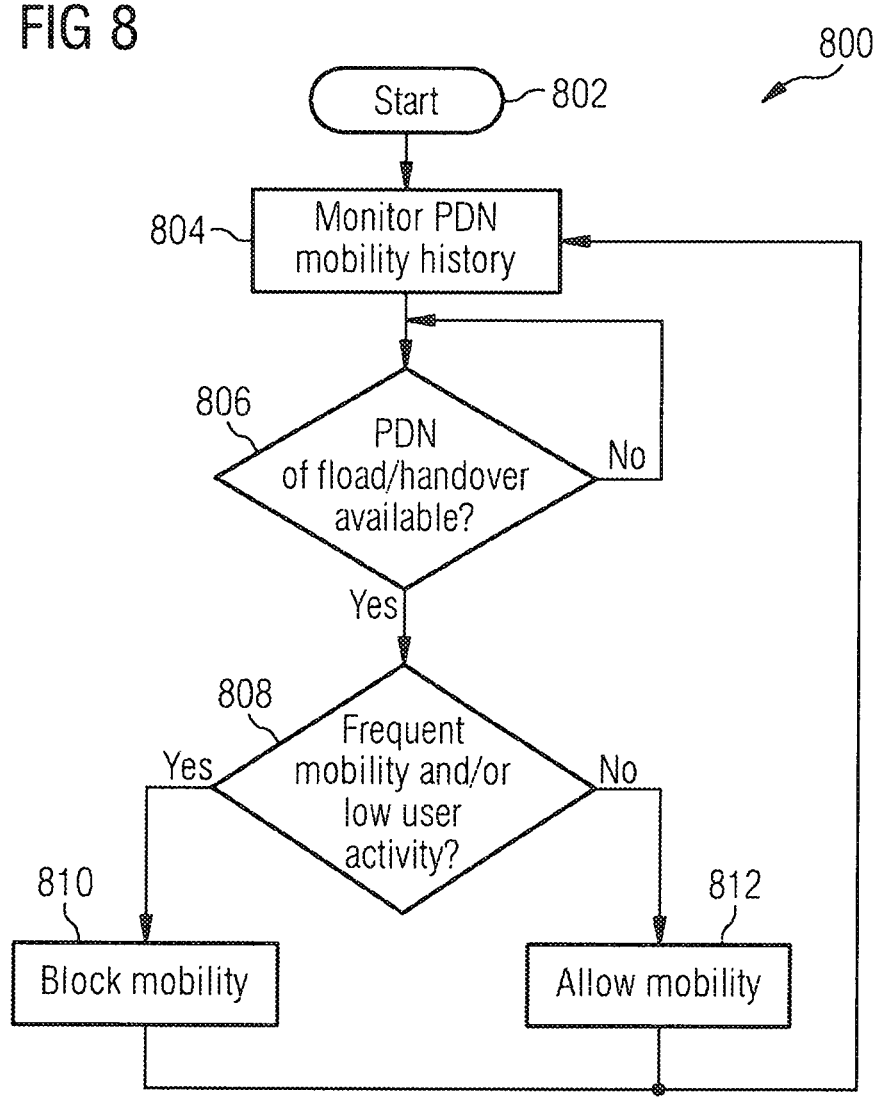

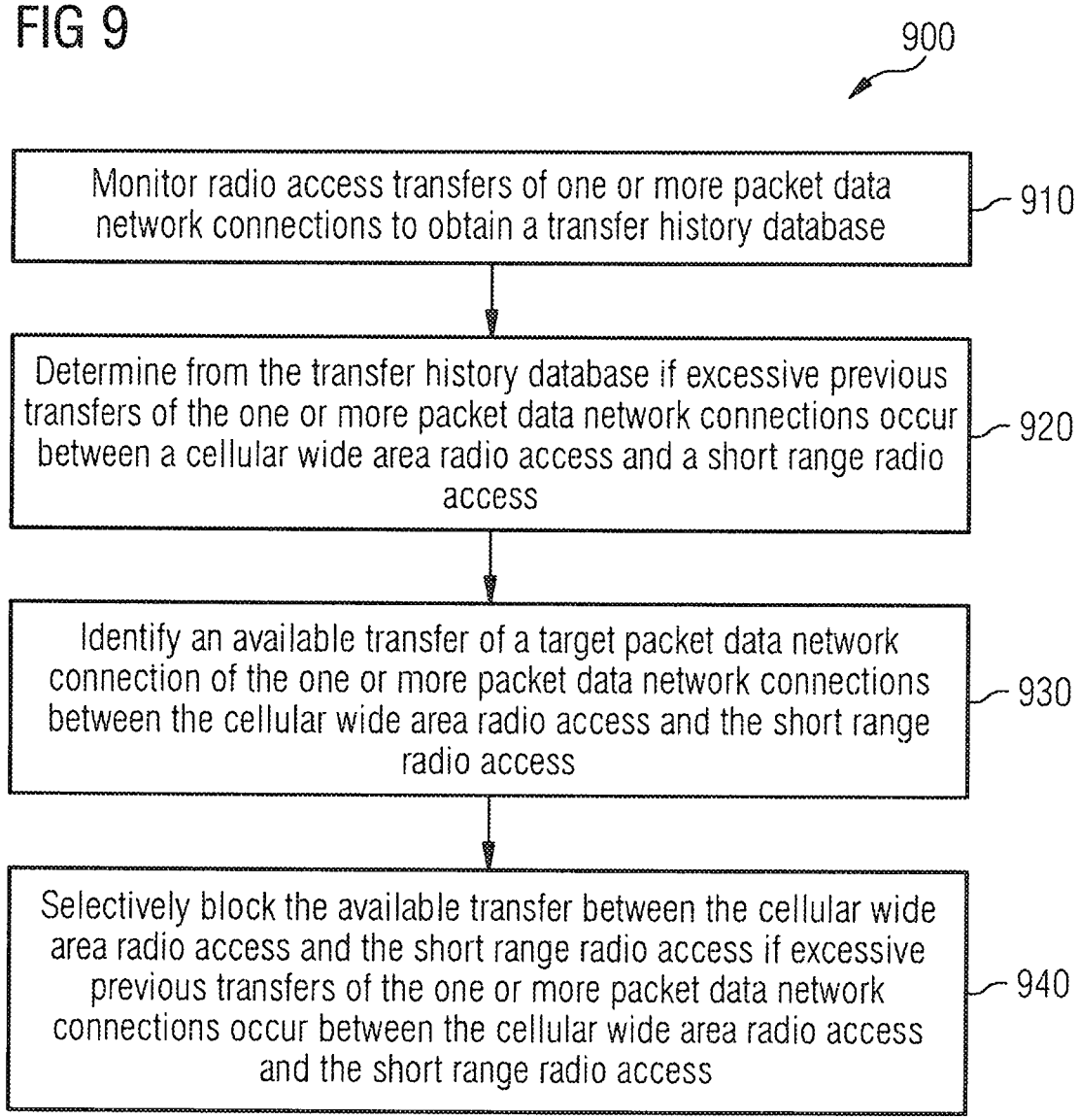

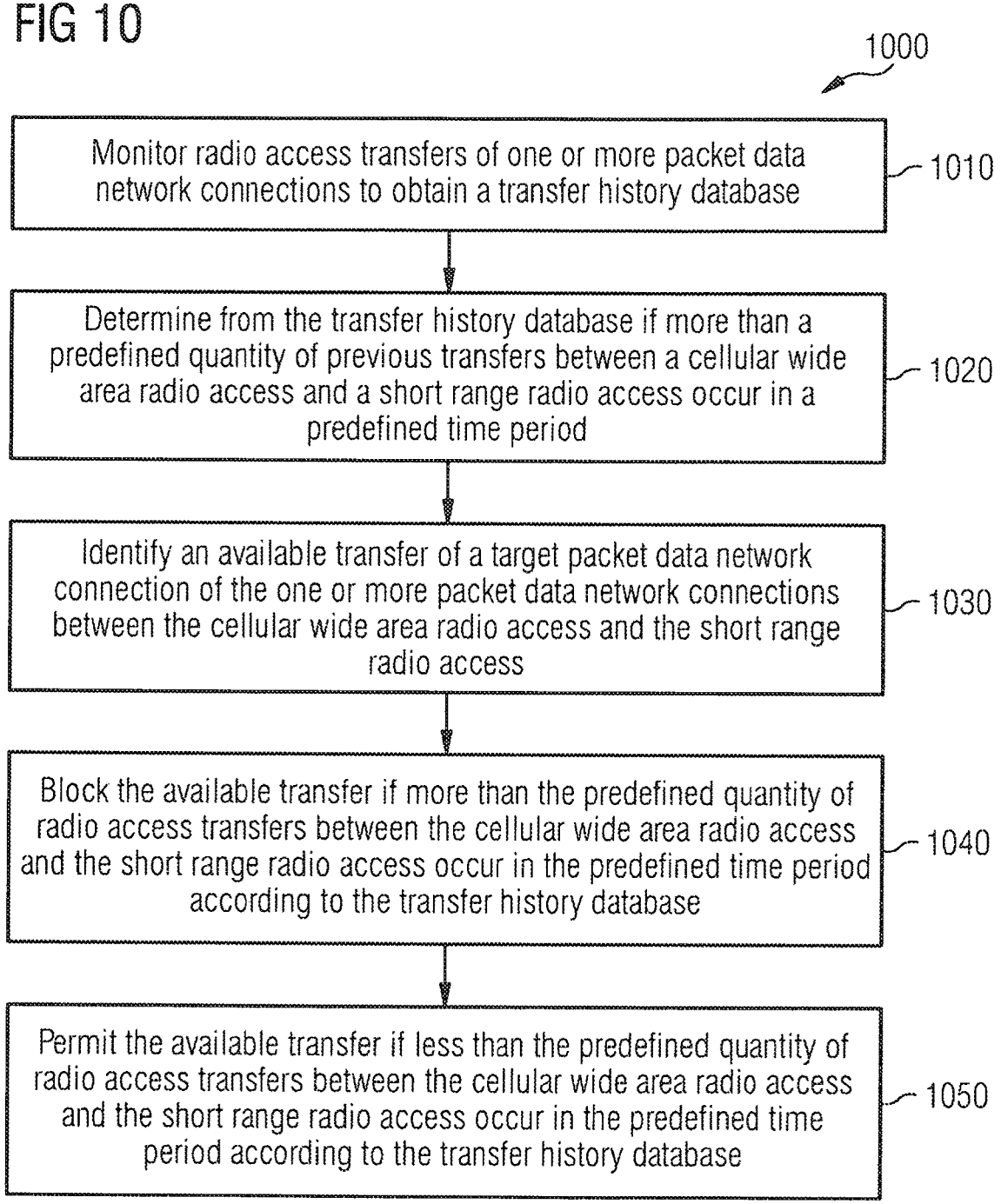

METHODS AND DEVICES FOR MANAGING PACKET DATA NETWORK CONNECTIONS

CROSS-REFERENCE TO RELATED APPLICATIONS

This application is a national stage entry according to 35 U.S.C 371 of WIPO Patent Application No. PCT/US2017/014210, filed Jan. 20, 2017 and incorporated herein by reference in its entirety, which claims priority to German Patent Application Serial No. 10 2016 102 983.1, which was filed Feb. 19, 2016 and is incorporated herein by reference in its entirety.

TECHNICAL FIELD

Various embodiments relate generally to methods and mobile communication devices for managing packet data network connections.

BACKGROUND

Mobile network operators have recently directed focus to Wireless Local Area Network (WLAN) technologies to offload data traffic from cellular data networks. Mobile network operators have targeted both operator-deployed WLAN Access Points (APs) in addition to private WLAN APs (e.g. WLAN APs at private residences or at other commercial entities) for WLAN offload, in which cellular data traffic may be transferred from cellular radio accesses to WLAN radio accesses. WLAN offload may thus allow mobile network operators to reduce both radio access and core network congestion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 shows a radio access network scenario related to PDN offload;

FIG. 3 shows a radio access network scenario related to PDN handover;

FIG. 4 shows a message sequence chart for PDN offload;

FIG. 5 shows a message sequence chart for PDN handover;

FIG. 8 shows a decision illustrating a PDN mobility management procedure;

FIG. 9 shows a first method for managing packet data network connections; and FIG. 10 shows a second method for managing packet data network connections.

DESCRIPTION

Figure 1:
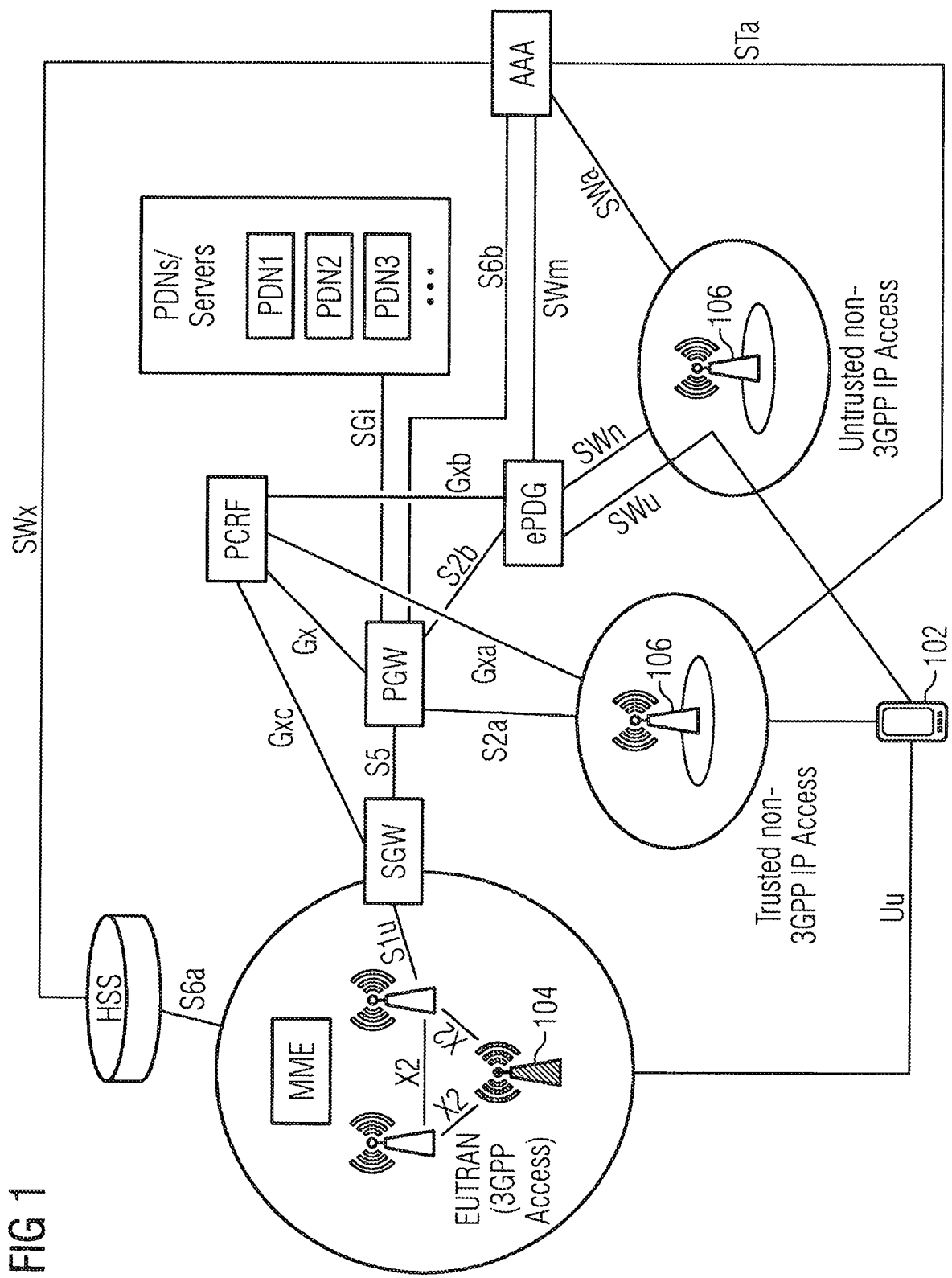
FIG. 1 shows a mobile network architecture.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel.

Furthermore, the term "cell" may be utilized to refer to any of a macrocell, microcell, femtocell, picocell, etc.

For purposes of this disclosure, radio communication technologies may be classified as one of a short range radio communication technology (or short range radio access) or cellular wide area radio communication technology (or cellular wide area radio access). Short range radio communication technologies include Bluetooth, Wireless Local Area Network (WLAN, e.g. according to any IEEE 802.11 standard, e.g. WiFi), and any other similar "short range" radio communication technologies. cellular wide area radio communication technologies include Global System for Mobile Communications (GSM) GSM, Universal Mobile Telecommunications System (UMTS), Long Term Evolution (LTE), LTE-Advanced (LTE-A), Code Division Multiple Access (CDMA), Wideband Code Division Multiple Access (WCDMA), LTE-Advanced (LTE-A), General Packet Radio Service (GPRS), Enhanced Data Rates for GSM Evolution (EDGE), High Speed Packet Access (HSPA), HSPA Plus (HSPA+), Worldwide Interoperability for Microwave Access (WiMax) (e.g. according to an IEEE 802.16 radio communication standard), and any other similar "mobile" or "cellular" radio communication technologies. Cellular wide area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct and indirect transmission. Similarly, the term "receive" encompasses both direct and indirect reception unless explicitly specified.

Multiple Access Packet Data Network (PDN) Connectivity (MAPCON) as introduced by the 3$^{rd}$ Generation Partnership Project (3GPP) in LTE Release 10 may allow mobile terminals to both offload PDN connections to non-cellular accesses (e.g. WLAN) and handover PDN connections back to the cellular accesses. Such PDN offload may alleviate network congestion in both the radio access and core sections of the cellular network by transferring data traffic from cellular access paths to non-cellular access paths, and accordingly may be an important tool for mobile network operators (MNOs) to support high demand for data traffic. However, the signaling for PDN mobility required to transfer PDN connections between cellular and non-cellular accesses may impose a high penalty on both the cellular network and the mobile terminal in the form of radio and core network congestion and mobile power usage. Such burdens may be aggravated if frequency PDN mobility operations occur, such as if a mobile terminal repeatedly moves in and out of a non-cellular coverage area that overlaps with cellular coverage. In such a scenario, the mobile terminal may trigger repeated PDN offload and handover between the cellular and non-cellular accesses, thus resulting in potentially excessive radio interference, core network congestion, and battery drain. As will be detailed, mobile terminals may selectively decide whether or not to perform PDN mobility operations in consideration of the potential advantages and disadvantages of transferring PDN connections.

Mobile terminals may have one or more PDN connections (i.e. data connections) which allow mobile terminals to exchange packet data through the core network with various PDNs (i.e. data networks external to the core network). In an LTE context, a mobile terminal (e.g. User Equipment (UE)) that is registered with the core network (Evolved Packet System (EPS) Mobility Management (EMM) Registered (EMM-REGISTERED) state) may be expected to have at least one active PDN connection. Accordingly, a registered mobile terminal may establish a PDN connection upon initial network Attach and may subsequently maintain at least one such PDN connection during both radio idle (Radio Resource Control (RRC)-IDLE) and radio connected (RRC-CONNECTED) states. Mobile terminals may establish additional PDN connections and exchange packet data with various PDNs, such as for voice data, video data, basic Internet/Web browsing, etc. Such PDN connections may remain logically active during radio idle states in order to allow for easy network notification of incoming PDN data (e.g. pinging) and for local applications of a mobile terminal to revive a PDN connection to receive packet data, e.g. without needing to fully re-establish a PDN connection upon entering radio connected state.

FIG. 1 shows an LTE network architecture illustrating PDN mobility between 3GPP and non-3GPP radio accesses, which is derived from Figure 4.2.2-1 "Non-Roaming Architecture within EPS using S5, S2a, S2b" in 3GPP TS 23.402, "Architecture enhancements for non-3GPP accesses", V13.4.0 ("3GPP TS 23.402"). In an abridged overview of LTE network architectures, UE 102 may establish a radio connection with serving base station (e.g. evolved NodeB (eNodeB or eNB)) 104 over a Uu interface as part of the RAN section of the cellular network (evolved UMTS RAN, or EUTRAN), where the cellular network is divided into a RAN section and a core network section. Serving base station 104 may be connected with one or more additional base stations over X2 interfaces. The base stations of the RAN may interface with the core network section (Evolved Packet Core (EPC)) over an S1-Mobility Management Entity (S1-MME, to an MME of the EPC) an S1-U (to a Serving Gateway (SGW) of the EPC), where the SGW and MME may be interfaced over an S11 interface. The MME may be connected to the Home Subscriber Service (HSS) via an S6a interface. The SGW may interface with the PDN Gateway (PDN) over an S5/S8 interface (depending on roaming conditions), which may act as a gateway to various PDNs, servers, and IP services external to the EPC. The SGW and PGW may interface with a Policy and Charging Rules Function (PCRF) entity over a Gxc and Gx interface, respectively.

Upon attaching to the cellular network via serving base station 104, mobile terminal 102 may register with the MME to realize an EMM-REGISTERED state. As indicated above, once registered mobile terminal 102 may be expected to maintain at least one active PDN connection while in the EMM-REGISTERED state. Accordingly, the MME and mobile terminal 102 may establish a default EPS bearer via the EPC between the PGW and mobile terminal 102, which mobile terminal 102 may subsequently utilize to support the PDN connection.

Accordingly, mobile terminal 102 may establish a PDN connection with one or more of e.g. PDN1, PDN2, PDN3, etc. Such PDNs may be for IP Multimedia Service (IMS, which may include e.g. voice traffic such as Voice over LTE (VoLTE)), web portals, basic Internet access, etc., and may each be identified by an Access Point Name (APN). Mobile terminal 102 may maintain at least one active PDN connection throughout the registration lifetime (EMM-REGISTERED) of mobile terminal 102, and accordingly may maintain at least one active PDN connection in both radio connected and radio idle states.

Mobile terminal 102 may establish one or more additional PDN connections in a similar manner, and accordingly may subsequently support multiple active PDN connections with various different PDNs via the EPC. PDN connections established with EPS bearers with the EUTRAN and EPC may be considered "3GPP access" PDN connections as the access path utilizes only 3GPP links from mobile terminal 102 to the connected PDN.

Mobile terminals such as mobile terminal 102 may thus transmit and receive packet data over the cellular network using such PDN connections. However, given the increasing demand in cellular data by mobile users, mobile network operators may experience congestion-related issues in the core network and/or RAN, such as e.g. excessive core network traffic, radio interference, and cell overloading.

In recognition thereof, mobile network operators may employ non-cellular "offloading" which utilize non-cellular resources to support user data traffic in order to alleviate congestion in the core network and/or RAN. While the disclosure may specifically refer to a 3GPP context such as MAPCON, it is understood that the systems detailed herein may be applied in any offloading context, in particular for offload from cellular to WLAN. Other non-cellular accesses may be analogously employed without departing from the scope of the disclosure.

In a MAPCON context, mobile terminal 102 may be able to support both 3GPP-access PDN connections in addition to non-3GPP-access PDN connections. Accordingly, mobile terminal 102 may be able to "offload" a PDN connection from cellular resources to non-cellular resources, such as by offloading a PDN connection from cellular to WLAN. Mobile terminal 102 may simultaneously maintain a cellular radio connection with the cellular network in order to support non-offloaded PDN connections (that remain on 3GPP accesses) in addition to other control and user plane cellular data.

Non-3GPP accesses may be classified as either "untrusted" or "trusted" non-3GPP accesses. Untrusted non-3GPP accesses may be wireless networks that such as public WiFi hotspots, or private WiFi networks (e.g. at a private residence), corporate WiFi hotspots, etc., while trusted non-3GPP accesses may include operator deployed WiFi networks and other non-3GPP wireless networks that are under the control of the MNO. As shown in FIG. 1, the connection path in PDN mobility procedures may differ depending on whether a non-3GPP access is trusted or untrusted. For example, mobile terminal 102 may wish to offload a PDN connection to WLAN AP 106 (as further detailed below). If WLAN AP 106 is an untrusted non-3GPP access, WLAN AP 106 may need to interface with the PGW via an evolved PDN Gateway (ePDG), which may allow untrusted non-3GPP accesses to interface with the PGW (via an S2b interface) in order to access the various operator IP services and PDN networks. WLAN AP 106 may also need to interface with an Authentication, Authorization, and Accounting (AAA) entity. If WLAN AP 106 is a trusted non-3GPP access, WLAN AP 106 may directly interface with the PGW via an S2a interface. Accordingly, the connection path of offloaded PDN connections may differ depending on the trusted/untrusted status of WLAN AP 106.

The decision to offload a PDN connection from cellular to WLAN may be contingent on the instant environment of a mobile terminal. FIG. 2 shows an exemplary scenario illustrating a potential offload situation for mobile terminal 102. Mobile terminal 102 may initially be connected to serving base station 104 and may accordingly utilize serving base station 104 to support one or more PDN connections via the attached core network. Serving base station 104 may provide cellular coverage over coverage area 200, which may correspond to a single cell (single sector) of serving base station 104.

WLAN AP 106 may provide WLAN coverage over coverage area 210, which may constitute a smaller coverage area than serving base station 104. As shown in FIG. 2, coverage area 210 may be contained within coverage area 200; alternatively, coverage area 210 may have a partial or no overlap with coverage area 200. As shown in FIG. 2, mobile terminal 102 may move into coverage are 210 of WLAN AP 106, and accordingly may be capable of initiating a wireless link with WLAN AP 106.

Upon entering coverage area 210, mobile terminal 102 may detect the presence of WLAN AP 106 (such as with a discovery procedure) and determine whether WLAN AP 106 is available for use by mobile terminal 102. If so, mobile terminal 102 may decide whether to offload one or more of the active PDN connections from serving base station 104 to WLAN AP 106. The decision to perform offloading may depend on a variety of offload evaluation criteria, such as whether the offload is RAN-assisted, channel conditions, data traffic type, etc.

The aforementioned channel conditions may be an important component of offload evaluation. For example, mobile terminal 102 may obtain channel condition criteria, such as thresholds, that define channel conditions when mobile terminal 102 is expected to offload PDN connections Mobile terminal 102 may perform radio measurements on radio signals received from WLAN AP 106 and utilize the WLAN radio measurements in conjunction with the cellular radio measurements to determine whether to offload. For example, mobile terminal 102 may similarly measure a signal strength (e.g. Received Signal Strength Indicator (RSSI)), signal quality (e.g. Signal to Noise Ratio (SNR)), or other channel quality metric (e.g. Bit/Packet/Block Error Rate) of radio signals received from WLAN AP 106 to evaluate the current radio link with WLAN AP 106.

Mobile terminal 102 may perform radio measurements on radio signals received from serving base station 104 and evaluate the radio measurements based on the obtained channel condition criteria to determine whether to offload. For example, mobile terminal 102 may measure a signal strength (e.g. Reference Signal Receive Power (RSRP) or RSSI), signal quality (e.g. Reference Signal Receive Quality (RSRQ) or SNR), or other channel quality metric (e.g. Bit/Packet/Block Error Rate) of radio signals received from serving base station 104 to evaluate the current radio link with serving base station 104

Accordingly, mobile terminal 102 may be able to evaluate the radio link with both serving base station 104 and WLAN AP 106 to determine whether to offload PDN connections.

For example, mobile terminal 102 may compare the WLAN radio measurements to respective thresholds to evaluate whether the WLAN radio link is suitable (of sufficient strength/quality, e.g. exceeding the respective thresholds). Mobile terminal 102 may then initiate PDN connection offloading if the WLAN radio link is acceptable, or may choose to not initiate PDN connection offloading if the WLAN radio link is not acceptable. Mobile terminal 102 may additionally be configured to repeat the WLAN radio measurements and evaluation to determine whether the WLAN radio link becomes acceptable at a later time.

Mobile terminal 102 may also compare the cellular radio measurements to respective thresholds to evaluate the current conditions of the cellular radio link, and may factor in such evaluation in determining whether to perform offloading. For example, if the cellular radio measurements indicate low signal quality and/or strength, mobile terminal 102 may be biased towards offloading, and may e.g. reduce the thresholds used in WLAN radio link evaluation. Many such variations are possible without departing from the scope of the disclosure.

Accordingly, mobile terminal 102 may determine whether to offload to WLAN and, if so, identify one or more PDN connections to offload to WLAN. As previously detailed, mobile terminal 102 may utilize specific criteria to evaluate radio link conditions and data traffic types in rendering such decisions. The specific criteria utilized by mobile terminal 102 may be either be provided by the cellular network, e.g. for RAN-assisted WLAN interworking, or may be specified by a vendor, e.g. non-RAN-assisted WLAN interworking. For example, in RAN-assisted WLAN interworking, mobile terminal 102 may receive the offload evaluation criteria as control signaling from the cellular network (e.g. via serving base station 104) that indicate specific thresholds and/or evaluation conditions for use in rendering offload decisions. Alternatively, for non-RAN-assisted interworking, the vendor may configured mobile terminal 102 with the offload evaluation criteria and accordingly specify the thresholds and/or evaluation conditions for use in rendering offload decisions. Regardless, mobile terminal 102 may follow such offload evaluation criteria in determining whether or not to offload PDN connections to WLAN.

In the event that mobile terminal 102 decides to offload one or more PDN connections to WLAN AP 106, mobile terminal 102 may proceed to establish a Virtual Private Network (VPN) via WLAN AP 106 with the PGW, which may be either directly over an S2a interface or via an ePDG and S2b interface depending on the trusted/untrusted status of WLAN AP 106.

Accordingly, mobile terminal 102 may "re-assign" (offload) one or more PDN connections to non-cellular accesses such as WLAN, where the decision to offload may be based on specific offload evaluation criteria. As mobile terminal 102 may be able to support multiple PDN connections, mobile terminal 102 may offload all active PDN connections or only some active PDN connections. In the event that mobile terminal 102 only offloads some active PDN connections, mobile terminal 102 may maintain the non-offloaded PDN connections on the original cellular access, and accordingly may simultaneously maintain one or more active PDN connections on cellular resources and one or more active PDN connections on non-cellular resources (i.e. that have been offloaded to non-cellular resources).

Mobile terminal 102 may trigger release of the cellular EPS bearer for the offloaded connections and begin utilizing WLAN AP 106 for the offloaded PDN connections. Mobile terminal 102 may continue to utilize WLAN AP 106 for the offloaded PDN connections for a period of time. However, due to device mobility and/or dynamic radio conditions, the radio link between mobile terminal 102 and WLAN AP 106 may deteriorate, such as if mobile terminal 102 moves outside of coverage area 210 as shown in FIG. 2. Mobile terminal 102 may continue to evaluate WLAN radio link conditions as detailed above in order to detect radio link deterioration, and accordingly may eventually determine that WLAN AP 106 is no longer suitable for supporting the offloaded PDN connections. Such may include performing radio measurements of signals received from serving base station 104, WLAN AP 106, and/or additional base stations of the cellular network. Mobile terminal 102 may then evaluate the obtained radio measurements similarly as to detailed above, e.g. using the same offload evaluation criteria or different handover evaluation criteria, in order to determine whether to handover the previously offloaded PDN connections (potentially in addition to any new PDN connections established over non-cellular access) back to cellular access. As shown in FIG. 3, mobile terminal 102 may remain in coverage area 200 of base station 104 upon exiting coverage area 210; however, mobile terminal 102 may alternatively move into the coverage area of a different base station of the cellular network (not explicitly shown in FIG. 3). Mobile terminal 102 may therefore evaluate one or more cellular base stations (which may or may not be part of the same cellular network as serving base station 104, e.g. the same or different Public Land Mobile Network (PLMN)) for potential handover of the active PDN connections on non-cellular access.

In the exemplary context of FIG. 3, mobile terminal 102 may select to handover the non-cellular access PDN connections from WLAN AP 106 back to serving base station 104. Accordingly, mobile terminal 102 may need to transfer (PDN handover) the non-cellular access PDN connections back to cellular access via signaling with the core network and trigger release of the non-cellular EPS bearer. Mobile terminal 102 may then continue to maintain the PDN connections after handover on cellular access via serving base station 104.

Mobile terminal 102 may need to transmit and receive various control signals for all such PDN mobility operations as detailed above, where non-cellular mobility operations include both offload (from cellular to non-cellular) and handover (from non-cellular to cellular) of PDN connections. While PDN mobility operations may overall alleviate network congestion by allowing for offload to non-cellular accesses, the requisite signaling for both PDN offload and PDN handover may be relatively excessive in certain cases. FIG. 4 illustrates the signaling involved in a 3GPP context for PDN offload from 3GPP access to non-3GPP (untrusted) access as detailed in Figure 8.2.3-1 of 3GPP TS 23.402"Architecture enhancements for non-3GPP accesses) Release 13 ("3GPP TS 23.402"). As shown in FIG. 4, PDN offload may involve significant signaling between a UE (e.g. mobile terminal 102), the non-3GPP IP Access (WLAN AP 106), and the various core network components including ePDG, MME/Serving General Packet Radio Service (GPRS) Support Node (SGSN), SGW, PGW, AAA Proxy (for roaming), Visited Policy and Charging Rules Function (vPCRF) (for roaming), Home-PCRF (hPCRF), and HSS/AAA. As depicted in FIG. 4, mobile terminal 102 may discover WLAN AP 106 (stage 2), associate and authenticate WLAN AP 106 and perform DNS query to determine if the ePDG is reachable (stage 3), setup the VPN with the ePDG (stage 4), and initiate release of the cellular PDN connection (stage 11). Furthermore, mobile terminal 102 may need to perform an IMS registration update (Session Initiation Protocol (SIP) Registration Update; following stage 11) if the PDN connection is an IMS PDN connection (i.e. IMS service using this PDN connection).

The PDN offload procedure may thus require considerable signaling. Mobile terminal 102 and the involved core network and non-cellular components may need to perform stages 3-11 for each PDN connection that is offloaded to non-cellular access, and may additionally need to perform IMS registration update if an IMS service is using the PDN connection. Accordingly, the amount of signaling required for PDN offload may linearly increase with the number of offloaded PDN connections.

PDN handover may similarly require significant signaling in order to handover PDN connections from non-cellular to cellular access. FIG. 5 shows Figure 8.2.1.3-1 of 3GPP TS 23.402 illustrating such a PDN handover, where a UE (mobile terminal 102) may handover a PDN connection from non-3GPP IP Access (WLAN AP 106 and the ePDG) to 3GPP access by attaching to the core network via the MME (stage 3; skipped if mobile terminal 102 did not fully detach/de-register from the cellular network), initiating RRC connection establishment (stage 11), initiating a PDN connection request with type set to handover (stage 17), initiating the PDN deactivation over WLAN and initiating the VPN release (stage 18), and potentially performing a PDN registration update (SIP Registration Update; following stage 18) if the PDN connection is an IMS PDN connection. Similarly to as detailed regarding FIG. 4, mobile terminal 102 and the involved core network and non-cellular components may need to perform stages 17-18 for each PDN connection that undergoes handover. Similarly to the PDN offload procedure, mobile terminal 102 may need to perform IMS registration update following PDN handover if an IMS service is using the PDN connection.

While PDN mobility operations may allow for the cellular network to alleviate congestion, both PDN offload and PDN handover thus require substantial signaling that spans both the RAN and core network. The involved signaling may be acceptable if PDN mobility operations are relatively infrequent; however, constant or repeated PDN offload and handover may result in radio interference, core network congestion, and battery drain at mobile terminals. For example, WLAN AP 106 may be located in a private residence or commercial building and coverage area 210 may only cover certain rooms or areas of the contained building. Accordingly, a user in an exemplary scenario may repeatedly move mobile terminal 102 within and out of coverage area 210 and may consequently trigger multiple PDN offloads and handovers. The signaling procedures detailed in FIGS. 4 and 5 required for PDN offload and handover may thus be triggered and as a result may impose a high penalty in terms of mobile power usage and network congestion.

In order to avoid the network and mobile burdens related to excessive PDN mobility, mobile terminal 102 may evaluate the current environment to render "smart" or "intelligent" decisions as to whether to initiate PDN mobility, i.e. for both PDN offload and PDN handover. Mobile terminal 102 may be configured to consider whether excessive PDN mobility has recently occurred (e.g. frequent PDN handover and offload) and/or the current status and type of active PDN connections (e.g. user activity on a given PDN connection and the type of the attached PDN) in determining whether or not to trigger PDN mobility.

Figure 6:
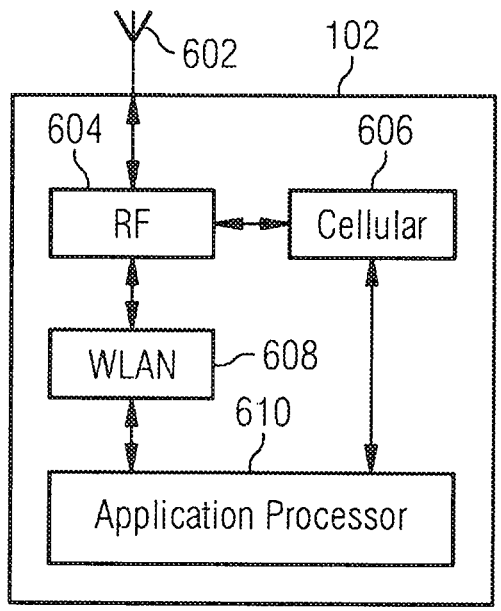
FIG. 6 shows an internal configuration of a mobile terminal.

FIG. 6 shows a block diagram illustrating an internal configuration of mobile terminal 102. As shown in FIG. 6, mobile terminal 102 may include antenna system 602, radio frequency (RF) transceiver 604, cellular modem 606, WLAN modem 608, and application processor 610. As shown in FIG. 6, the aforementioned components of mobile terminal 102 may be implemented as separate components. However, it is appreciated that the architecture of mobile terminal 102 depicted in FIG. 6 is for purposes of explanation, and accordingly one or more of the aforementioned components of mobile terminal 102 may be integrated into a single equivalent component or divided into two separate components with collective equivalence. Mobile terminal 102 may have one or more additional components, such as additional hardware, software, or firmware elements including processors/microprocessors, controllers/microcontrollers, memory, other specialty or generic hardware/processors/circuits, etc., in order to support a variety of additional operations. Mobile terminal 102 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

As will be detailed, in an aspect of the disclosure mobile terminal 102 may be a mobile communication for transmitting and receiving communication signals, the mobile communication device including a first modem configured to transmit and receive radio signals on a cellular wide area radio access, a second modem configured to transmit and receive radio signals on a short range radio access, and a connection management circuit configured to monitor radio access transfers of one or more packet data network connection to generate a transfer history database, determine from the transfer history database if excessive previous transfers of the one or more packet data network connections occur between the cellular wide area radio access and the short range radio access, identify an available transfer of a target packet data network connection of the one or more packet data network connections between the first modem and the second modem, and selectively block the available transfer between the first modem and the second modem based on if excessive previous transfers of the one or more packet data network connections occur between the first modem and the second modem. In another aspect of the disclosure, mobile terminal 102 may be a mobile communication device for transmitting and receiving communication signals, the mobile communication device including a first modem configured to transmit and receive radio signals on a cellular wide area radio access, a second modem configured to transmit and receive radio signals on a short range radio access, and a connection management circuit configured to monitor radio access transfers of one or more packet data network connections to generate a transfer history database, determine from the transfer history database if more than a predefined quantity of previous transfers between the cellular wide area radio access and the short range radio access occur in a predefined time period, identify an available transfer of a target packet data network connection of the one or more packet data network connections between a cellular wide area radio access and a short range radio access, block the available transfer if more than a predefined quantity of radio access transfers between the first modem and the second modem occur in a predefined time period according to the transfer history database, and permit the available transfer if less than the predefined quantity of radio access transfers between the first modem and the second modem occur in the predefined time period according to the transfer history database.

In an abridged overview of the operation of mobile terminal 102, mobile terminal 102 may be configured to receive and transmit wireless signals in accordance with various different wireless access protocols or radio access technologies (RATs), including any one or combination of LTE, WLAN, WiFi, UMTS, GSM, Bluetooth, CDMA, WCDMA, Bluetooth, etc. The RAT capabilities of mobile terminal 102 may be determined by one or more Subscriber Identity Modules (SIM) included in mobile terminal 102 (not explicitly shown in FIG. 6). In accordance with the exemplary LTE context introduced above regarding FIG. 1, cellular modem 606 may be an LTE modem, and accordingly may support the transmission and reception of LTE signals on LIE networks. Although antenna system 602 and RF transceiver 604 are depicted in FIG. 6 as being shared between cellular modem 606 and WLAN modem 608, antenna system 602 and RF transceiver 604 may each be composed of discrete components each respectively allocated to one of cellular modem 606 and WLAN modem 608, such as a separate cellular antenna (or antenna array) and cellular RE front end for cellular modem 606 and a separate WLAN antenna (or antenna array) and WLAN front end for WLAN modem 608. Similar variations are possible without departing from the scope of the disclosure.

Further to the abridged overview of operation of mobile terminal 102, RF transceiver 604 may receive radio frequency wireless signals via antenna 602, which may be implemented as e.g. a single antenna or an antenna array composed of multiple antennas. RF transceiver 604 may include various reception circuitry components, which may include analog circuitry configured to process externally received signals such as e.g. mixing circuitry to convert externally received RF signals to baseband and/or intermediate frequencies. RF transceiver 604 may also include amplification circuitry to amplify externally received signals, such as power amplifiers (PAs) and/or Low Noise Amplifiers (LNAs), although it is appreciated that such components may also be implemented separately. RF transceiver 604 may additionally include various transmission circuitry components configured to transmit internally received signals, such as e.g. baseband and/or intermediate frequency signals provided by cellular modem 606 and/or WLAN modem 608, which may include mixing circuitry to modulate internally received signals onto one or more radio frequency carrier waves and/or amplification circuitry to amplify internally received signals before transmission. RF transceiver 604 may provide such signals to antenna 602 for wireless transmission. Further references herein to reception and/or transmission of wireless signals by mobile terminal 102 may thus be understood as an interaction between antenna 602, RF transceiver 604, and cellular modem 606 and/or WLAN modem 608 as detailed above. Although not explicitly depicted in FIG. 6, RF transceiver 604 may be additionally be connected to application processor 610.

Application processor 610 may be implemented as a Central Processing Unit (CPU), and may be configured to execute various applications and/or programs of mobile terminal 102, such as e.g. applications corresponding to program code stored in a memory component of mobile terminal 102 (not explicitly shown in FIG. 6). Application processor 610 may also be configured to control one or more further components of mobile terminal 102, such as user input/output devices (display(s), keypad(s), touchscreen(s), speaker(s), external button(s), camera(s), microphone(s), etc.), peripheral devices, memory, power supply, external device interfaces, etc. Although cellular modem 606, WLAN modem 608, and application processor 610 are depicted separately in FIG. 6, it is appreciated that this illustration is not limiting in nature. Accordingly, it is understood that cellular modem 606, WLAN modem 606, and application processor 610 may be implemented separately, implemented together (i.e. as an integrated unit or on a common chip), or partially implemented together.

Cellular modem 606 and WLAN modem 608 may each be configured to manage wireless communications on cellular and WLAN radio accesses, respectively. Skilled persons will appreciate the various possible hardware, software, and firmware configurations available to realize such wireless communications on cellular modem 606, WLAN modem 608, and application processor 610. For example, mobile terminal 102 may need to perform cellular and WLAN communications according to respective cellular and WLAN protocols in order to properly communicate with cellular and WLAN access points (e.g. cellular base stations and WLAN APs, respectively). Accordingly, mobile terminal 102 may need to execute a cellular protocol stack to dictate communication flows for cellular communications and a WLAN protocol stack to dictate communication flows for WLAN communications. Mobile terminal 102 may execute the respective protocol stacks as software (on a processor, as further detailed below) to control various communication hardware components, such as for cellular and WLAN physical layer (PHY, i.e. Layer 1) circuitry respectively included in cellular modem 606 and WLAN modem 608, e.g. Each protocol stack may dictate communications on the respective access, and accordingly may be responsible for both user and control plane signaling such as detailed in FIGS. 4 and 5.

Figure 7:
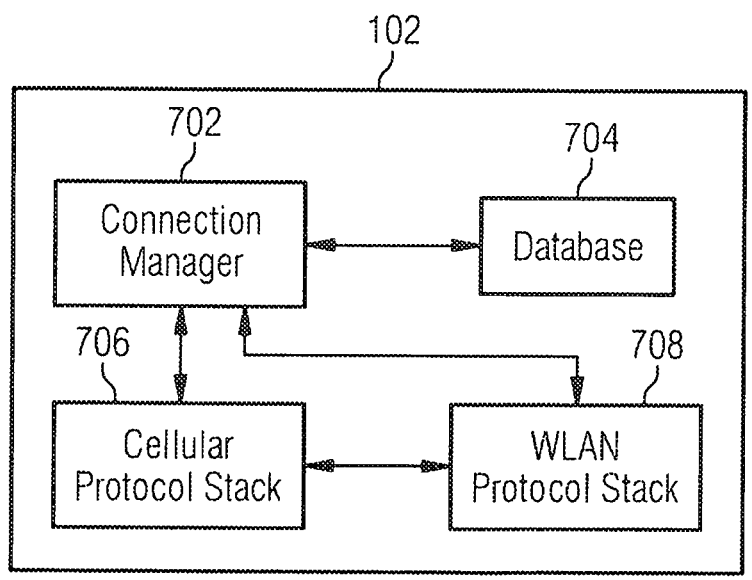
FIG. 7 shows a block diagram illustrating functional elements of a mobile terminal.

Mobile terminal 102 may execute the respective protocol stacks as program code defined as instructions for arithmetic, logical, control, and input/output (I/O) operations executed on a processor. FIG. 7 illustrates the cellular (706) and WLAN (708) protocol stacks within mobile terminal 102 at a functional level, where cellular protocol stack 706 and WLAN protocol stack 708 may be implemented as a set of software instructions and executed by a processor of mobile terminal 102. Accordingly, cellular modem 606 may include a cellular protocol processor core configured to execute cellular protocol stack 706 as software while WLAN modem 608 may include a WLAN protocol processor configured core to execute WLAN protocol stack 708 as software. Alternatively, mobile terminal 102 may include a unified protocol processor core configured to execute both cellular protocol stack 706 and WLAN protocol stack 708. Alternatively, mobile terminal 102 may execute one or both of cellular protocol stack 706 and WLAN protocol stack 708 at application processor 610. FIG. 7 thus depicts cellular protocol stack 706 and WLAN protocol stack 708 as separate blocks to denote the functional distinction between the respective protocol stacks; however, mobile terminal 102 may execute both cellular protocol stack 706 and WLAN protocol stack 708 at a common processor core.

As shown in FIG. 7, mobile terminal 102 may also include connection manager 702, which may similarly be a set of program instructions executed as software at a processor core of mobile terminal 102 (e.g. a processor core of cellular modem 606, WLAN modem 608, a separate processor core, or application processor 610). As will be detailed, connection manager 702 may be responsible for managing and directing PDN mobility operations including PDN offload and handover. As shown in FIG. 7, connection manager 702 may interface with both cellular protocol stack 706 and WLAN protocol stack 708 in order to direct PDN mobility decisions as well as monitor cellular and WLAN radio link conditions.

In order to avoid the network congestion and battery penalties associated with excessive PDN offload and handover, connection manager 702 may monitor PDN mobility operations in order to determine whether PDN mobility is being excessively triggered. Connection manager 702 may also monitor the current active PDN connections of mobile terminal 102 and may decide whether to block or prevent PDN mobility in certain scenarios. For example, connection manager 702 may block PDN offload of a given PDN connection if mobile terminal 102 has recently triggered multiple PDN offloads and handovers to the same WLAN AP and/or the given PDN connection has little or no user activity. Accordingly, connection manager 702 may avoid offloading a sparsely used PDN connection back and forth to the same WLAN AP and accordingly may reduce network congestion and battery drain by avoiding the PDN offload signaling procedures (as detailed in FIG. 3). Connection manager 702 may similarly control PDN handover, and thus may prevent repeated PDN handover (if possible) with the same WLAN AP for sparsely used PDN connections. Such repeated and frequent PDN mobility operations, i.e. repetitive PDN offload and handover between a specific cellular access (e.g. 3GPP cell) and a specific non-cellular access (e.g. a WLAN AP) in a short period of time, may be caused by device micromobility. For example, a user may repeatedly move mobile terminal 102 into and out of coverage area 210, such as e.g. if WLAN AP 106 provides WLAN coverage in a building and a user of mobile terminal 102 repeatedly walks inside and outside of the building or e.g. if WLAN AP 106 provides WLAN coverage to part of a building and a user of mobile terminal 102 repeatedly walks into and outside of coverage area 210 within the building. Connection manager 702 may utilize database 704 (which may be realized as a memory element) to track PDN mobility operations (PDN offload and handover) in order to detect excessive PDN mobility scenarios (which may occur as a result of device micromobility) and control subsequent PDN mobility based on whether PDN micromobility is detected.

FIG. 8 shows method 800 for controlling PDN mobility, which may be performed by connection manager 702 (i.e. executed by a processor core of mobile terminal 102). After initiating in 802, connection manager 702 may monitor PDN mobility history in 804, which may include recording all PDN mobility operations (PDN offload and handover) in database. For example, connection manager 702 may update database 704 following each successful PDN offload and handover to record information about each PDN mobility operation. Accordingly, for each PDN offload connection manager 702 may record the identity of the origin cell (e.g. the serving cell of serving base station 104, such as with a Physical Cell Identity (PCI) or other cell identity information) and the identity of the destination AP (e.g. WLAN AP 106, such as the WLAN AP Basic Service Set (BSS) ID (BSSID) and/or WLAN AP Media Access Control (MAC) address). As mobile terminal 102 may have multiple active PDN connections, connection manager 702 may additionally record the identity of the offloaded PDN connection and the identity of the PDN (e.g. an Access Point Name (APN), IP Address, Primary/Secondary DNS, etc.). Connection manager 702 may additionally record timing information of the PDN handover, such as a timestamp identifying when the PDN occurred.

Connection manager 702 may similarly record origin (WLAN AP) and destination (cell) access point identity information, PDN identity information, and timing information for each PDN handover in database 704. Connection manager 702 may thus record each PDN offload and handover in database 704. Database 704 may be realized as a memory configured to store and retrieve information for PDN mobility events as provided by connection manager 702. Database 704 may have a limited capacity, and accordingly may be able to store information for a limited number of PDN mobility events. Connection manager 702 may thus be configured to detect excessive PDN mobility scenarios based on the PDN mobility events stored in database 704 at any time.

Connection manager 702 may continuously check whether PDN offload or handover is available in 806, and may be responsible for triggering radio measurement at cellular modem 606 and WLAN modem 608, and may subsequently receive the resulting radio measurements and perform the requisite evaluation to determine whether PDN offload or handover should be triggered. As previously detailed, the offload/handover evaluation criteria may be provided by the cellular network (e.g. for RAN-assisted WLAN interworking) or preconfigured by e.g. the vendor (e.g. for non-RAN-assisted WLAN interworking). In the case of RAN-assisted WLAN interworking, cellular modem 606 may need to receive the offload/handover evaluation criteria from the cellular network and provide the offload/handover evaluation criteria to connection manager 702. Regardless, connection manager 702 may utilize the offload/handover evaluation criteria in 806 to determine the availability of PDN offload and/or handover. If connection manager 702 determines in 806 that PDN offload/handover is not available (e.g. the cellular and WLAN radio link conditions do not satisfy the offload/handover evaluation criteria for offload or handover), connection manager 702 may continue to periodically evaluate the environment of mobile terminal 102 to determine if PDN offload or handover is available at a later time. Alternatively, PDN mobility decisions may be rendered at cellular protocol stack 706 and/or WLAN protocol stack 708, which may leave connection manager 702 responsible for blocking particular PDN mobility decisions made at cellular protocol stack 706 and/or WLAN protocol stack 708. Connection manager 702 may thus block or allow particular PDN mobility events by providing a PDN blocking signal to cellular protocol stack 706 and/or WLAN protocol stack 708.

If connection manager 702 determines that PDN offload or handover is available in 806, connection manager 702 may proceed to 808 to determine whether PDN offload or handover should be blocked. For example, connection manager 702 may have determined in 806 that a first PDN connection for PDN2 should be offloaded from a first cell of serving base station 104 to WLAN AP 106 (as in FIGS. 1-3), where the first cell is the current serving cell of mobile terminal 102. Connection manager 702 may thus check in 808 whether offload of the first PDN connection from the first cell to WLAN AP 106 should be blocked.

As previously indicated, connection manager 702 may render decisions to block PDN mobility based on detected excessive PDN mobility (e.g. repeated and frequent PDN offload and handover between a specific cellular access and specific non-cellular access, which may be related to device micromobility). Accordingly, connection manager 702 may refer to database 704 to determine whether offload from the first cell to WLAN AP 106 is related to excessive PDN mobility (as further detailed below).

If connection manager 702 determines that PDN connections have recently been transferred between the first cell and WLAN AP 106 in a repetitive manner, connection manager 702 may determine that excessive PDN mobility between the first cell and WLAN AP 106 is an issue, and accordingly may block the PDN offload to WLAN AP 106 in 810. Alternatively, if connection manager 702 determines that excessive PDN mobility is not an issue, connection manager 702 may allow the PDN offload in 812.

In the event of 810 or 812, connection manager 702 may control cellular protocol stack 706 and/or WLAN protocol stack 708 according to the decision rendered in 808, which may include triggering PDN offload or handover at cellular protocol stack 706 and WLAN protocol stack 708 (e.g. as detailed regarding FIGS. 4 and 5) or preventing PDN offload or handover at cellular protocol stack 706 and WLAN protocol stack 708.

Connection manager 702 may then return to 804 to record the allowance or blocking as determined in 808 in database 704. For example, if connection manager 702 allowed the PDN offload in 808, connection manager 702 may update database 704 to record identity information for the first cell, WLAN AP 106, the first PDN connection, and timing information indicating the time of the PDN offload. If connection manager 702 blocked the PDN offload in 808, connection manager 702 may update database 702 to record that PDN offload was blocked for the first PDN connection between the first cell and WLAN AP 106, which may include identity information for the first cell, WLAN AP 106, the first PDN connection, and timing information indicating the time that the PDN offload was blocked. Connection manager 702 may subsequently utilize the information recorded in database 704 for subsequent blocking decisions in 808.

Connection manager 702 may utilize various criteria for detecting excessive PDN mobility in 808. As previously detailed, connection manager 702 may associate excessive PDN mobility with frequent PDN offload and handover between a specific cellular access and a specific non-cellular access over a recent period of time. Connection manager 702 may rely on the PDN mobility history recorded in database 704 in order to detect excessive PDN mobility. For example, returning to the exemplary PDN offload of the first PDN connection from the first cell to WLAN AP 106, upon detecting that the PDN offload is available in 806 connection manager 702 may refer to database 704 to determine whether connection manager 702 has previously triggered PDN offload and handover between the first cell to WLAN AP 106. In a scenario where a user repeatedly moves mobile terminal 102 between coverage area 200 and coverage area 210, connection manager 702 may previously have transferred PDN connections between the first cell and WLAN AP 106 and recorded such PDN mobility operations in database 704.

Accordingly, connection manager 702 may identify all such PDN mobility operations between the first cell and WLAN AP 106 and determine the total quantity of PDN mobility operations, e.g. a PDN mobility count, between the first cell and WLAN AP 106 (which may account for PDN mobility events for all PDN connections, i.e. the PDN connection targeted for offload in addition to other active or previously active PDN connections). Of the total quantity of PDN mobility operations, connection manager 702 may additionally identity the number of PDN mobility operations (e.g. for all PDN connections of mobile terminal 702) between the first cell and WLAN AP 106 that occurred over a recent time period, such as e.g. the previous minute, previous 5 minutes, previous 20 minutes, etc. Connection manager 702 may then compare the identified quantity to a predetermined PDN mobility time period threshold to determine whether the recent PDN mobility operations between the first cell and WLAN AP 106 qualify as excessive PDN mobility. For example, if connection manager 702 previously performed e.g. at least two PDN offloads and PDN handovers between the first cell and WLAN AP 106 of any PDN connection (e.g. offload→handover→offload→handover) within a recent time period (i.e. the PDN mobility time period threshold), connection manager 702 may block an available PDN offload from the first cell back to WLAN AP 106. Connection manager 702 may utilize various different PDN mobility count and time period thresholds in rendering such determinations. Such may be conversely applied to PDN handovers in an analogous manner.

Additionally and/or alternatively, connection manager 702 may block all available offloads of the first PDN connection from the first cell to WLAN AP 106 following handover of the first PDN connection from WLAN AP 106 to the first cell for a predefined period of time, i.e. a PDN mobility blocking timer. For example, upon identifying an available PDN offload of the first PDN connection from the first cell to WLAN AP 106 in 806 connection manager 702 may refer to database 704 to determine if the first PDN connection was recently handed over from WLAN AP 106 to the first cell and, if so, the elapsed time since the PDN handover of the first PDN connection. If the first PDN connection was recently handed over from WLAN AP 106 to the first cell within a predetermined recent period of time (i.e. PDN mobility blocking timer), connection manager 702 may block the PDN offload. Such may be conversely applied to PDN handovers in an analogous manner. In other words, connection manager 702 may start a timer following PDN offload/handover of a PDN connection from a cell to a WLAN AP and may prevent PDN handover/offload of the PDN connection from the WLAN AP back to the cell until expiry of the PDN mobility blocking timer. Accordingly, connection manager 702 may prevent frequent PDN mobility operations between the same two points. As opposed to blocking PDN mobility of a given PDN connection for a predefined period of time following a previous PDN mobility event of the given PDN connection, connection manager 702 may block PDN mobility for all PDN connections for a predefined period of time following the most recent PDN mobility event of any PDN connection.

In a configuration in which connection manager 702 utilizes a PDN mobility blocking timer, connection manager 702 may simplify database 704 and e.g. only record the most recent PDN mobility event in database 704. After recording the occurrence of a PDN mobility event in database 704, connection manager 702 may initiate the PDN mobility blocking timer and subsequently block all PDN mobility events until the expiry of the PDN mobility timer. Accordingly, database 704 may have a reduced capacity and only need to hold the most PDN mobility event.

Connection manager 702 may thus determine whether or not to block PDN mobility in 808 based on PDN mobility count/time period thresholds and/or PDN mobility blocking timers, which connection manager 702 may utilize to detect excessive PDN mobility. Returning to the FIGS. 2 and 3, it may be particularly applicable for connection manager 702 to block PDN offload as a result of the placement of cellular coverage areas relative to non-cellular coverages such as WLAN. Specifically, cellular coverage may be widespread and continuous, while WLAN APs may only offer contained and sporadic coverage. Although not drawn to scale, FIGS.

2 and 3 depict a potential coverage scenario in which coverage area 210 of WLAN AP 106 is contained within coverage area 200 of serving base station 104. Accordingly, mobile terminal 102 may maintain cellular coverage from serving base station 104 while located within coverage area 210, and thus may be able to continuously maintain all active PDN connections on cellular access via base station 104 while located within coverage area 210. Mobile terminal 102 may thus be able to block PDN offload to WLAN AP 106 and nevertheless maintain the active PDN connections.

However, the converse may not be true for PDN handover. Assuming mobile terminal 102 offloads at least one PDN connection to non-cellular access via WLAN AP 106 while located in coverage area 210, mobile terminal 102 may only be able to effectively maintain the PDN connection via WLAN AP 106 while mobile terminal 102 remains located within coverage area 210. Accordingly, WLAN AP 106 may not be able to provide a sufficient radio link if mobile terminal 102 moves outside of coverage area 210. Connection manager 702 may thus not have the same level of freedom to block PDN handovers, as mobile terminal 102 may eventually move far enough outside of coverage area 210 that the radio link with WLAN AP 106 will fail.

Connection manager 702 may consider additional criteria in rendering blocking decisions in 808. For example, connection manager 702 may consider radio link conditions for cellular and non-cellular radio accesses in blocking decisions, such as by raising and/or lowering blocking thresholds, i.e. PDN mobility count/time period thresholds and/or PDN mobility blocking timer, dependent on observed radio link conditions. Connection manager 702 may thus trigger radio measurement at cellular protocol stack 706 and WLAN protocol stack 708, which cellular modem 606 and WLAN modem 608 may subsequently perform and report back to connection manager 702. Connection manager 702 may then consider the radio measurements during blocking decisions in 808.

For example, in deciding whether to block a particular PDN offload from the first cell to WLAN AP 106, connection manager 702 may receive radio measurements from cellular protocol stack 706 and WLAN protocol stack 708. If the cellular radio measurements indicate relatively poor signal strength and/or quality for the radio link with the first cell, connection manager 702 may relax the PDN mobility thresholds, i.e. increase the PDN mobility count threshold for blocking and/or reduce the PDN mobility time threshold and/or reduce the PDN mobility blocking timer, in order to bias PDN offload decision toward triggering PDN offload (i.e. not blocking PDN offloads). Connection manager 702 may similarly relax the PDN mobility count/time period thresholds and/or PDN mobility blocking timers for PDN handover decisions if WLAN radio measurements indicate relatively poor signal strength and/or quality. Accordingly, connection manager 702 may bias towards PDN mobility operations if the current radio access (e.g. cellular for PDN offload and non-cellular for PDN handover) indicates poor radio link conditions by increasing the number of PDN mobility events that are associated with excessive PDN mobility (increase the PDN mobility count threshold) and/or decreasing the recent time period for excessive PDN mobility (decrease the PDN mobility time period threshold) and/or decreasing the PDN mobility blocking timer.

Connection manager 702 may additionally consider the user activity on PDN connections available for PDN mobility. For example, connection manager 702 may identify that the first PDN connection with PDN2 is suitable for PDN offload from the first cell to WLAN AP 106. Connection manager 702 may then evaluate the first PDN connection to determine whether the user of mobile terminal 102 is utilizing the first PDN connection, such as by identifying whether the bandwidth or data rate of the first PDN connection exceeds a predefined threshold, where connection manager 702 may obtain the bandwidth or data rate from cellular protocol stack 706. If connection manager 702 determines that the bandwidth or data rate of the first PDN connection is below the predefined threshold, connection manager 702 may determine that the first PDN connection is not being actively utilized by a user, and accordingly may decide to block offload in 808. Alternatively, connection manager 702 may allow PDN offload in 808 if the bandwidth or data rate of the first PDN connection exceeds the thresholds. Connection manager 702 may similarly apply a bandwidth or data rate threshold for PDN handover decisions. Connection manager 702 may thus avoid PDN mobility operations for sparsely utilized PDN connections, thus avoiding the signaling associated with PDN mobility operations. Such may be particularly applicable if mobile terminal 102 is in a radio idle state (at cellular protocol stack 706), as all active PDN connections may be in a relatively dormant state. Connection manager 702 may thus decide to block PDN mobility operations when mobile terminal 102 is in a radio idle state, or may decide to block PDN mobility operations when excessive PDN mobility is detected and mobile terminal 102 is in a radio idle state.

Connection manager 702 may additionally consider battery charge level of mobile terminal 102 in PDN mobility blocking. As previously detailed, PDN mobility operations may impose a significant battery penalty due to the signaling procedures involved in transferring PDN connections between cellular and non-cellular accesses. Accordingly, connection manager 702 may determine the current battery charge level at 808, such as by receiving an indication of the battery charge level from application processor 610 (e.g. from the Operating System (OS) of mobile terminal 102). If the battery charge level is below a battery level threshold, connection manager 702 may bias PDN mobility blocking decisions towards blocking, such as by tightening the PDN mobility thresholds, e.g. reducing PDN mobility event count thresholds and/or increasing the PDN mobility blocking timer and/or increasing the excessive PDN mobility detection time period. Accordingly, connection manager 702 may avoid performing PDN offload and/or handover in order to potentially conserve battery power.

Connection manager 702 may additionally consider the type of PDN connection in PDN mobility decisions. For example, certain types of PDN connections may be more suitable for cellular access than non-cellular access. Such may include voice and/or video PDN connections (such as for IMS PDN networks), which may benefit from the consistent radio coverage provided by cellular accesses. Other PDN connections, such as basic Internet access/Web browsing and other "bursty" packet data, may be more suitable to non-cellular offload. Accordingly, when determining whether to offload a given PDN connection manager 702 may evaluate the type of PDN connection in order to determine whether the given PDN connection is suitable for offload to non-cellular resources. Connection manager 702 may thus block PDN offload of voice and/or video PDN connections while allowing offload of "bursty" PDN connections (which may include using different PDN mobility thresholds for voice/video and bursty PDN mobility blocking decisions). Similarly, if a PDN connection such as voice or video has previously been offloaded to non-cellular resources (e.g. due to decreasing cellular radio link conditions), connection manager 702 may bias PDN mobility blocking decisions towards allowing such voice or video PDN connections to be handed over to cellular accesses.

Connection manager 702 may thus have available numerous criteria to evaluate PDN mobility blocking decisions in 808. Connection manager 702 may evaluate PDN mobility for each active PDN connection separately or uniformly, such as by uniformly blocking PDN mobility for all PDN connections or by allowing PDN mobility for certain PDN connections while blocking PDN mobility for others. Furthermore, connection manager 702 may utilize any combination of the criteria detailed herein, in addition to other criteria not explicitly mentioned, in order to render PDN mobility blocking decisions in 808. Skilled persons will appreciate the various criteria configurations available based on excessive PDN mobility (frequent/repetitive PDN mobility over a recent period of time), cellular and/or non-cellular radio link conditions, user activity, PDN connection type/status, etc., such as by using one of or any combination of criteria in addition to tightening/relaxing the various associated thresholds based on certain criteria.

Additionally, connection manager 702 may make PDN mobility blocking decisions based on specific PDN mobility paths, e.g. from a specific cell to a specific WLAN AP, or uniformly. For example, as detailed above connection manager 702 may record past PDN mobility events in database 704 according to the original access point identity (e.g. serving base station 104 or WLAN AP 106), target access point identity (e.g. serving base station 104 or WLAN AP 106), PDN connection identity, and timing information, and may decide to block subsequent PDN mobility between the original access point and target access point if excessive PDN mobility conditions occur between the original access point and target access point (e.g. repeated and/or frequent PDN offload and handover between the original and target access points). Accordingly, regardless of any excessive PDN mobility between the original and target access points, connection manager 702 may permit other PDN mobility paths, such as between one of the original or target access point and a different access point (e.g. a different cell or different WLAN AP). Alternatively, connection manager 702 may decide to block all PDN mobility events between all access points if excessive PDN mobility is detected between any two access points. Furthermore, connection manager 702 may decide to allow or block all PDN mobility events if excessive PDN mobility is detected between any accesses, i.e. regardless of the specific identify of the involved access points. Such variations are thus additionally recognized.

Furthermore, connection manager 702 may be configured to consider failed PDN mobility events in PDN blocking decisions at 808. For example, connection manager 702 may additionally record the occurrence of failed PDN mobility events in database 704, such as if connection manager 702 attempts to perform a PDN offload or handover (e.g. as in FIG. 4 or 5) that is unsuccessful. Connection manager 702 may record the original and target access point identities in addition to the PDN connection identity and a timestamp. If connection manager 702 identifies subsequent availability of PDN mobility between the original and/or target access point, connection manager 702 may block the PDN mobility event if less than a predetermined amount of time has passed since the PDN mobility failure or if a certain number of failures have been observed over a recent period of time. Additionally, connection manager 702 may interact with WLAN modem 608 to prevent WLAN modem 608 from performing WLAN scans (e.g. WiFi scan) or prevent WLAN modem 608 from associating with WLAN AP 106 in case of repeated PDN mobility failures, which may be particularly applicable if mobile terminal 102 is not utilizing WLAN AP 106 for other services (i.e. except for attempting to offload/handover the PDN connection).

Connection manager 702 may additionally utilize a validity timer for entries in database 704. For example, connection manager 702 may only consider previous PDN mobility operations (recorded in database 704) valid for a certain amount of time. Such may prevent connection manager 702 from blocking PDN mobility based on out-of-date or obsolete database entries. Accordingly, connection manager 702 may only consider PDN mobility operations recorded in database 704 valid for a validity time period, and may thus need to "re-learn" if PDN mobility operations should be blocked based on new information if database 704 is out-of-date.

Connection manager 702 may additionally incorporate geolocation information such as Global Navigation Satellite System (GNSS) tags, e.g. Global Positioning System (GPS), Galileo, Beidou, or Global Navigation Satellite System (GLONASS). For example, mobile terminal 102 may additionally include a GPS system, which may provide connection manager 702 with location information of mobile terminal 102. Connection manager 702 may then compare location information of mobile terminal 102 with predetermined locations, such as a home or work place of a user of mobile terminal 102, and may then apply pre-configured blocking policies for PDN mobility depending on the location for mobile terminal 102. For example, connection manager 702 may determine that mobile terminal 102 is located at a home location of a user of mobile terminal 102 based on predetermined location information of a home location and location information provided by a GPS system of mobile terminal 102. Connection manager 702 may then apply a specific PDN mobility blocking policy that is pre-configured for the home location, such as allowing all PDN offloads e.g. in order to utilize a user's private home WiFi network for PDN offload whenever possible. Connection manager 702 may utilize a different PDN mobility blocking policy for other identified device locations, such as blocking all PDN offloads in certain locations. Connection manager 702 may be configured to apply such pre-configured PDN mobility blocking policies regardless of the validity of database 704.

Connection manager 702 may additionally learn blocking policies for PDN mobility based on geolocation information. For example, connection manager 702 may identify a location, such as e.g. home or work place, and subsequently learn which PDN mobility blocking procedure to apply when connection manager 702 detects that mobile terminal 102 is located in a known location. Accordingly, connection manager 702 may maintain application of the PDN blocking policy for the duration of time that mobile terminal 102 remains in the known location, and may not need to rely on an expiry timer for database 704 for triggering of a learning phase. In the absence of such positioning information, connection manager 702 may need to periodically trigger a learning phase to detect changes in the environment of mobile terminal 102, such as a change in the location of a proximate WLAN AP.

Connection manager 702 may similarly be configured to utilize predefined PDN blocking policies for specific WLAN APs (identified by e.g. BSSID or MAC address), such as utilizing a predefined PDN blocking policy for a WLAN AP identified as a user's home or work WiFI network and utilizing default PDN blocking policies for unknown WLAN APs. Numerous similar configurations are recognized as possible.

Connection manager 702 may therefore render decisions to block or allow particular PDN mobility events based on a variety of different criteria related to the current environment of mobile terminal 102. In doing so, connection manager 702 may assist in alleviating network congestion and avoiding battery penalties associated with engaging in the considerable signaling required for PDN mobility events. Connection manager 702 may in particular avoid PDN mobility events in excessive PDN mobility scenarios, where PDN offload and handover is repeatedly triggered between a particular cellular and non-cellular access point pair. Connection manager 702 may be configured to evaluate a number of different criteria in addition to excessive PDN mobility in such PDN mobility blocking decisions, such as cellular and/or non-cellular radio link conditions, user activity, PDN connection type/status, etc.

FIG. 9 shows method 900 for managing packet data network connections. As shown in FIG. 9, method 900 includes monitoring radio access transfers of one or more packet data network connections to generate a transfer history database (910), determining from the transfer history database if excessive previous transfers of the one or more packet data network connections occur between a cellular wide area radio access and a short range radio access (920), identifying an available transfer of a target packet data network connection of the one or more packet data network connections between the cellular wide area radio access and the short range radio access (930), and selectively blocking the available transfer between the cellular wide area radio access and the short range radio access if excessive previous transfers of the one or more packet data network connections occur between the cellular wide area radio access and the short range radio access (940).

In one or more further exemplary aspects of the disclosure, one or more of the features described above in reference to FIGS. 1-8 may be further incorporated into method 900. In particular, method 900 may be configured to perform further and/or alternate processes as detailed regarding mobile terminal 102 and/or connection manager 702.

FIG. 10 shows method 1000 for managing packet data network connection. As shown in FIG. 10, method 1000 may include monitoring radio access transfers of one or more packet data network connections to generate a transfer history database (1010), determining from the transfer history database if more than a predefined quantity of previous transfers between a cellular wide area radio access and a short range radio access occur in a predefined time period (1020), identifying an available transfer of a target packet data network connection of the one or more packet data network connections between the cellular wide area radio access and the short range radio access (1030), blocking the available transfer if more than the predefined quantity of radio access transfers between the cellular wide area radio access and the short range radio access occur in the predefined time period according to the transfer history database (1040), and permitting the available transfer if less than the predefined quantity of radio access transfers between the cellular wide area radio access and the short range radio access occur in the predefined time period according to the transfer history database (1050).

In one or more further exemplary aspects of the disclosure, one or more of the features described above in reference to FIGS. 1-8 may be further incorporated into method 1000. In particular, method 1000 may be configured to perform further and/or alternate processes as detailed regarding mobile terminal 102 and/or connection manager 702

The above disclosure may expressly refer to 3GPP accesses regarding cellular accesses and WLAN accesses as regarding non-cellular accesses. The implementations and systems detailed herein are analogously applicable to any cellular and/or non-cellular accesses.

The terms "user equipment", "UE", "mobile terminal", "user terminal", etc., may apply to any wireless communication device, including cellular phones, tablets, laptops, personal computers, wearables, multimedia playback devices, consumer/home appliances, vehicles, etc., and any number of additional electronic devices capable of wireless communications.

While the above descriptions and connected Figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of the disclosure:

Example 1 is a method for managing packet data network connections, the method including monitoring radio access transfers of one or more packet data network connections to generate a transfer history database, determining from the transfer history database if excessive previous transfers of the one or more packet data network connections occur between a cellular wide area radio access and a short range radio access, identifying an available transfer of a target packet data network connection of the one or more packet data network connections between the cellular wide area radio access and the short range radio access, and selectively blocking the available transfer between the cellular wide area radio access and the short range radio access if excessive previous transfers of the one or more packet data network connections occur between the cellular wide area radio access and the short range radio access.

In Example 2, the subject matter of Example 1 can optionally include wherein monitoring radio access transfers of the one or more packet data network connections to generate the transfer history database includes monitoring successful radio access transfers of the one or more packet data network connections between the cellular wide area radio access and the short range radio access to include in the transfer history database.

In Example 3, the subject matter of Example 1 or 2 can optionally include wherein selectively blocking the available transfer between the cellular wide area radio access and the short range radio access includes blocking the available transfer if excessive previous transfers of the one or more packet data network connections occur, and permitting the available transfer if excessive previous transfers of the one or more packet data network connections do not occur.

In Example 4, the subject matter of Example 1 can optionally include wherein selectively blocking the available transfer between the cellular wide area radio access and the short range radio access includes blocking the available transfer if more than a predefined quantity of transfers between the cellular wide area radio access and the short range radio access occur in a predefined time period.

In Example 5, the subject matter of any one of Examples 1 to 4 can optionally include wherein monitoring radio access transfers of the one or more packet data network connections to generate the transfer history database includes recording an origin access point, an end access point, and a transfer time in the transfer history database for each monitored radio access transfer.

In Example 6, the subject matter of Example 5 can optionally include wherein selectively blocking the available transfer between the cellular wide area radio access and the short range radio access if excessive previous transfers of the one or more packet data network connections occur between the cellular wide area radio access and the short range radio access includes evaluating the recorded origin access point, the recorded end access point, and the recorded transfer time for one or more radio access transfers stored in the transfer history database to determine if excessive previous transfers of the one or more packet data network connections occur between the cellular wide area radio access and the short range radio access.

In Example 7, the subject matter of Example 6 can optionally include wherein selectively blocking the available transfer between the cellular wide area radio access and the short range radio access if excessive previous transfers of the one or more packet data network connections occur between the cellular wide area radio access and the short range radio access further includes blocking the available transfer if more than a predefined quantity of transfers between the cellular wide area radio access and the short range radio access occur in a predefined time period according to the recorded origin access points, the recorded end access points, and the recorded transfer times of the one or more radio access transfers.

In Example 8, the subject matter of any one of Examples 5 to 7 can optionally include wherein recording the origin access point, the end access point, and the transfer time in the transfer history database for each monitored radio access transfer includes recording identity information of the origin access point and identity information of the end access point in the transfer history database.

In Example 9, the subject matter of Example 8 can optionally include wherein the identity information of the origin access point and the identity information of the end access point include at least one of a cell identity, Physical Cell Identity (PCI), Media Access Control (MAC) address, or a Basic Service Set Identifier (BSSID) address.

In Example 10, the subject matter of any one of Examples 1 to 9 can optionally include wherein monitoring radio access transfers of the one or more packet data network connections to generate the transfer history database includes recording at least a most recent transfer of the one or more packet data network connections in the transfer history database.

In Example 11, the subject matter of Example 1 can optionally include wherein selectively blocking the available transfer between the cellular wide area radio access and the short range radio access if excessive previous transfers of the one or more packet data network connections occur between the cellular wide area radio access and the short range radio access includes blocking the available transfer if a predefined time period has not passed since a most recent transfer of the one or more packet data network connections.

In Example 12, the subject matter of any one of Examples 1 to 11 can optionally include wherein identifying the available transfer of the target packet data network connection between the cellular wide area radio access and the short range radio access includes evaluating radio measurements of the cellular wide area radio access or radio measurements of the short range radio access, and identifying the available transfer based on whether the radio measurements of the cellular wide area radio access or the radio measurements of the short range radio access satisfy predetermined transfer criteria.

In Example 13, the subject matter of Example 12 can optionally include wherein the predetermined transfer criteria include signal power thresholds or signal quality thresholds.

In Example 14, the subject matter of any one of Examples 1 to 11 can optionally include wherein identifying the available transfer of the target packet data network connection between the cellular wide area radio access and the short range radio access includes evaluating the cellular wide area radio access and the short range radio access to determine whether radio access transfers are available, and selecting the target packet data network connection from the one or more packet data network connections if radio access transfers are available.

In Example 15, the subject matter of Example 14 can optionally include wherein evaluating the cellular wide area radio access and the short range radio access to determine whether radio access transfers are available includes comparing radio measurements of the cellular wide area radio access or radio measurements of the short range radio access to radio signal thresholds.

In Example 16, the subject matter of any one of Examples 1 to 15 can optionally include wherein the available transfer of the target packet data network connection is a radio access transfer of the target packet data network connection from the cellular wide area radio access to the short range radio access.

In Example 17, the subject matter of any one of Examples 1 to 15 can optionally include wherein the available transfer of the target packet data network connection is an available transfer of the target packet data network connection from the short range radio access to the cellular wide area radio access.

In Example 18, the subject matter of Example 1 can optionally further include identifying a quantity of recent transfers of the one or more packet data network connections between the cellular wide area radio access and the short range radio access from the transfer history database, and wherein selectively blocking the available transfer between the cellular wide area radio access and the short range radio access if excessive previous transfers of the one or more packet data network connections occur between the cellular wide area radio access and the short range radio access includes blocking the available transfer if the quantity of recent transfers exceeds a predefined transfer count threshold.

In Example 19, the subject matter of Example 18 can optionally further include permitting the available transfer if the quantity of recent transfers does not exceed the predefined transfer count threshold.

In Example 20, the subject matter of Example 18 or 19 can optionally include wherein identifying the quantity of recent transfers of the one or more packet data network connections between the cellular wide area radio access and the short range radio access from the transfer history database includes identifying one or more transfers included in the transfer history database that occur in a predefined time window as the quantity of recent transfers.

In Example 21, the subject matter of any one of Examples 1 to 20 can optionally further include selectively blocking the available transfer further based on one or more of a user activity level of the target packet data network connection, a connection type of the target packet data network connection, radio measurements of the cellular wide area radio access, radio measurements of the short range radio access, or a battery level.

In Example 22, the subject matter of any one of Examples 1 to 20 can optionally further include selectively blocking the available transfer based on a user activity level of the target packet data network connection.

In Example 23, the subject matter of Example 22 can optionally include wherein selectively blocking the available transfer based on the user activity level of the target packet data network connection includes blocking the available transfer if the user activity level of the target packet data network connection is less than a predefined activity level threshold.

In Example 24, the subject matter of Example 22 can optionally include wherein selectively blocking the available transfer based on the user activity level of the target packet data network connection includes permitting the available transfer if the user activity level of the target packet data network connection is greater than a predefined activity level threshold.

In Example 5, the subject matter of Example 23 or 24 can optionally include wherein the predefined activity level threshold is a data bandwidth threshold or a data throughput threshold.

In Example 26, the subject matter of any one of Examples 1 to 20 can optionally further include selectively blocking the available transfer based on a connection type of the target packet data network connection.

In Example 27, the subject matter of Example 26 can optionally include wherein selectively blocking the available transfer based on the connection type of the target packet data network connection includes blocking the available transfer if the connection type of the target packet data network connection is a first connection type, and permitting the available transfer if the connection type of the target packet data network connection is a second connection type.

In Example 28, the subject matter of Example 27 can optionally include wherein the first connection type is a voice data connection or a video data connection.

In Example 29, the subject matter of Example 27 or 28 can optionally include wherein the first connection type is an IP Multimedia Subsystem (IMS) connection.

In Example 30, the subject matter of any one of Examples 27 to 29 can optionally include wherein the second connection type is a bursty data traffic connection.

In Example 31, the subject matter of any one of Examples 27 to 30 can optionally include wherein the second connection type is an Internet or Web data connection.

In Example 32, the subject matter of any one of Examples 1 to 20 can optionally further include selectively blocking the available transfer based on a battery level.

In Example 33, the subject matter of any one of Examples 1 to 20 can optionally further include blocking the available transfer if a battery level is below a predefined battery level threshold, and permitting the available transfer if the battery level is above the predefined battery level threshold.

In Example 34, the subject matter of any one of Examples 1 to 33 can optionally include wherein the cellular wide area radio access is a $3^{rd}$ Generation Partnership Project (3GPP) radio access and the short range radio access is a Wireless Local Area Network (WLAN) radio access.

In Example 35, the subject matter of any one of Examples 1 to 33 can optionally include wherein the cellular wide area radio access is a Long Term Evolution (LTE) radio access and the short range radio access is a Wireless Local Area Network (WLAN) radio access.

In Example 36, the subject matter of any one of Examples 1 to 33 can optionally include wherein the cellular wide area radio access is a 3GPP network cell and the short range radio access is a WLAN Access Point (AP).

Example 37 is a mobile communication device including a cellular wide area radio access modem, a short range radio access modem, and a connection management circuit configured to interact with the cellular wide area radio access modem and short range radio access modem to perform the method of any one of Examples 1 to 36.

Example 38 is a non-transitory computer readable medium storing instructions that when executed by a processor direct the processor to perform the method of any one of Examples 1 to 36.

Example 39 is a method for managing packet data network connections, the method including monitoring radio access transfers of one or more packet data network connections to generate a transfer history database, determining from the transfer history database if more than a predefined quantity of previous transfers between a cellular wide area radio access and a short range radio access occur in a predefined time period, identifying an available transfer of a target packet data network connection of the one or more packet data network connections between the cellular wide area radio access and the short range radio access, blocking the available transfer if more than the predefined quantity of radio access transfers between the cellular wide area radio access and the short range radio access occur in the predefined time period according to the transfer history database, and permitting the available transfer if less than the predefined quantity of radio access transfers between the cellular wide area radio access and the short range radio access occur in the predefined time period according to the transfer history database.

In Example 40, the subject matter of Example 39 can optionally include wherein monitoring radio access transfers of the one or more packet data network connections to generate the transfer history database includes monitoring successful radio access transfers of the one or more packet data network connections between the cellular wide area radio access and the short range radio access to include in the transfer history database.

In Example 41, the subject matter of Example 39 or 40 can optionally include wherein monitoring radio access transfers of one or more packet data network connections to generate the transfer history database includes recording an origin access point, an end access point, and a transfer time in the transfer history database for each monitored radio access transfer.

In Example 42, the subject matter of Example 41 can optionally include wherein determining from the transfer history database if more than the predefined quantity of previous transfers between the cellular wide area radio access and the short range radio access occur in the predefined time period determining whether more than the predefined quantity of radio access transfers between the cellular wide are radio access and the short range radio access occur in the predefined time period according to the origin access points, end access points, and transfer times of the transfer history database.

In Example 43, the subject matter of Example 41 or 42 can optionally include wherein recording the origin access point, the end access point, and the transfer time in the transfer history database for each monitored radio access transfer includes recording identity information of the origin access point and identity information of the end access point.

In Example 44, the subject matter of Example 43 can optionally include wherein the identity information of the origin access point and the identity information of the end access point include at least one of a cell identity, Physical Cell Identity (PCI), Media Access Control (MAC) address, or a Basic Service Set Identifier (BSSID) address.

In Example 45, the subject matter of any one of Examples 39 to 44 can optionally include wherein monitoring radio access transfers of one or more packet data network connections to generate the transfer history database includes recording at least a most recent transfer of the one or more packet data network connections in the transfer history database.

In Example 46, the subject matter of Example 39 can optionally include wherein blocking the available transfer if more than the predefined quantity of radio access transfers between the cellular wide area radio access and the short range radio access occur in the predefined time period according to the transfer history database includes blocking the available transfer if the predefined time period has not passed since a most recent transfer of the one or more packet data network connections.

In Example 47, the subject matter of any one of Examples 39 to 46 can optionally include wherein identifying the available transfer of the target packet data network connection between the cellular wide area radio access and the short range radio access includes evaluating radio measurements of the cellular wide area radio access or radio measurements of the short range radio access, and identifying the available transfer based on whether the radio measurements of the cellular wide area radio access or the radio measurements of the short range radio access satisfy predetermined transfer criteria.

In Example 48, the subject matter of Example 47 can optionally include wherein the predetermined transfer criteria include signal power thresholds or signal quality thresholds.

In Example 9, the subject matter of any one of Examples 39 to 46 can optionally include wherein identifying the available transfer of the target packet data network connection between the cellular wide area radio access and the short range radio access includes evaluating the cellular wide area radio access and the short range radio access to determine whether radio access transfers are available, and selecting the target packet data connection from the one or more packet data network connections if radio access transfers are available.

In Example 50, the subject matter of Example 49 can optionally include wherein evaluating the cellular wide area radio access and the short range radio access to determine whether radio access transfers are available includes comparing radio measurements of the cellular wide area radio access or radio measurements of the short range radio access to radio signal thresholds.

In Example 51, the subject matter of any one of Examples 39 to 50 can optionally include wherein the available transfer of the target packet data network connection is a radio access transfer of the target packet data network connection from the cellular wide area radio access to the short range radio access.

In Example 52, the subject matter of any one of Examples 39 to 50 can optionally include wherein the available transfer of the target packet data network is a radio access transfer of the target packet data network connection from the short range radio access to the cellular wide area radio access.

In Example 53, the subject matter of Example 39 can optionally further include identifying one or more radio access transfers from the transfer history database that occur in the predefined time period, and wherein blocking the available transfer if more than the predefined quantity of radio access transfers between the cellular wide area radio access and the short range radio access occur in the predefined time period according to the transfer history database includes determining whether the number of one or more radio access transfers exceeds a predefined transfer count threshold.

In Example 54, the subject matter of any one of Examples 39 to 53 can optionally further include blocking the available transfer further based on one or more of a user activity level of the target packet data network connection, a connection type of the target packet data network connection, radio measurements of the cellular wide area radio access, radio measurements of the short range radio access, or a battery level.

In Example 55, the subject matter of any one of Examples 39 to 53 can optionally include wherein blocking the available transfer if more than the predefined quantity of radio access transfers between the cellular wide area radio access and the short range radio access occur in the predefined time period according to the transfer history database includes blocking the available transfer based on a user activity level of the target packet data connection.

In Example 56, the subject matter of Example 55 can optionally include wherein blocking the available transfer based on the user activity level of the target packet data connection includes blocking the available transfer if the user activity level of the target packet data network connection is less than a predefined activity level threshold, and permitting the available transfer if the user activity level of the target packet data connection is greater than the predefined activity level threshold.

In Example 57, the subject matter of Example 55 can optionally include wherein the predefined activity level threshold is a data bandwidth threshold or a data throughput threshold.

In Example 58, the subject matter of any one of Examples 39 to 53 can optionally further include blocking the available transfer based on a connection type of the target packet data network connection.

In Example 59, the subject matter of any one of Examples 39 to 53 can optionally further include blocking the available transfer if a connection type of the target packet data network connection is a first connection type, and permitting the available transfer if the connection type of the target packet data network connection is a second connection type.

In Example 60, the subject matter of Example 59 can optionally include wherein the first connection type is a voice data connection or a video data connection.

In Example 61, the subject matter of Example 59 or 60 can optionally include wherein the first connection type is an IP Multimedia Subsystem (IMS) connection.

In Example 62, the subject matter of any one of Examples 59 to 61 can optionally include wherein the second connection type is a bursty data traffic connection.

In Example 63, the subject matter of any one of Examples 59 to 62 can optionally include wherein the second connection type is an Internet or Web data connection.

In Example 64, the subject matter of any one of Examples 39 to 53 can optionally further include blocking the available transfer based on a battery level.

In Example 65, the subject matter of any one of Examples 39 to 53 can optionally further include blocking the available transfer if a battery level is below a predefined battery level threshold, and permitting the available transfer if the battery level is above the predefined battery level threshold.

In Example 66, the subject matter of any one of Examples 39 to 65 can optionally include wherein the wherein the cellular wide area radio access is a $3^{rd}$ Generation Partnership Project (3GPP) radio access and the short range radio access is a Wireless Local Area Network (WLAN) radio access.

In Example 67, the subject matter of any one of Examples 39 to 65 can optionally include wherein the cellular wide area radio access is a Long Term Evolution (LTE) radio access and the short range radio access is a Wireless Local Area Network (WLAN) radio access.

In Example 68, the subject matter of any one of Examples 39 to 65 can optionally include wherein the cellular wide area radio access is a 3GPP network cell and the short range radio access is a WLAN Access Point (AP).

Example 69 is a mobile communication device including a cellular wide area radio access modem, a short range radio access modem, and a connection management circuit configured to interact with the cellular wide area radio access modem and short range radio access modem to perform the method of any one of Examples 39 to 68.

Example 70 is a non-transitory computer readable medium storing instructions that when executed by a processor direct the processor to perform the method of any one of Examples 39 to 68.

Example 71 is a mobile communication device for transmitting and receiving communication signals, the mobile communication device including a first modem configured to transmit and receive radio signals on a cellular wide area radio access, a second modem configured to transmit and receive radio signals on a short range radio access, and a connection management circuit configured to monitor radio access transfers of one or more packet data network connection to generate a transfer history database, determine from the transfer history database if excessive previous transfers of the one or more packet data network connections occur between the cellular wide area radio access and the short range radio access, identify an available transfer of a target packet data network connection of the one or more packet data network connections between the first modem and the second modem, and selectively block the available transfer between the first modem and the second modem based on if excessive previous transfers of the one or more packet data network connections occur between the first modem and the second modem.

In Example 72, the subject matter of Example 71 can optionally include wherein the connection management circuit is configured to interact with the first modem and the second modem to block or permit radio access transfers between the first modem and the second modem.

In Example 73, the subject matter of Example 71 or 72 can optionally include wherein the connection management circuit is configured to monitor radio access transfers of the one or more packet data network connections to generate the transfer history database by monitoring successful radio access transfers of the one or more packet data network connections between the cellular wide area radio access and the short range radio access to include in the transfer history database.

In Example 74, the subject matter of any one of Examples 71 to 73 can optionally include wherein the connection management circuit is configured to selectively block the available transfer between the first modem and the second modem by blocking the available transfer if excessive previous transfers of the one or more packet data network connections occur, and permit the available transfer excessive previous transfers of the one or more packet data network connections do not occur.

In Example 75, the subject matter of any one of Examples 71 to 73 can optionally include wherein the connection management circuit is configured to selectively block the available transfer between the first modem and second modem by blocking the available transfer if more than a predefined quantity of transfers between the first modem and the second modem occur in a predefined time period according to the transfer history database.

In Example 76, the subject matter of any one of Examples 71 to 75 can optionally include wherein connection management circuit is configured to monitor radio access transfers of the one or more packet data network connections to generate the transfer history database by recording an origin access point, an end access point, and a transfer time in the transfer history database for each monitored radio access transfer.

In Example 77, the subject matter of Example 76 can optionally include wherein the connection management circuit is configured to selectively block the available transfer between the first modem and the second modem by evaluating the recorded origin access point, the recorded end access point, and the recorded transfer time for one or more radio access transfers stored in the transfer history database to determine whether excessive previous transfers of the one or more packet data network connection occur between the cellular wide area radio access and the short range radio access.

In Example 78, the subject matter of Example 76 can optionally include wherein the connection management circuit is configured to selectively block the available transfer between the first modem and the second modem by blocking the available transfer if more than a predefined quantity of transfers between the cellular wide area radio access and the short range radio access occur in a predefined time period according to the recorded origin access points, the recorded end access points, and the recorded transfer times of the one or more radio access transfers.

In Example 79, the subject matter of any one of Examples 76 to 78 can optionally include wherein the connection management circuit is configured to record the origin access point, the end access point, and the transfer time in the transfer history database for each monitored radio access transfer by recording identity information of the origin access point and identity information of the end access point in the transfer history database.

In Example 80, the subject matter of Example 79 can optionally include wherein the identity information of the origin access point and the identity information of the end access point include at least one of a cell identity, Physical Cell Identity (PCI), Media Access Control (MAC) address, or a Basic Service Set Identifier (BSSID) address.

In Example 81, the subject matter of any one of Examples 71 to 80 can optionally include wherein connection management circuit is configured to monitor radio access transfers of the one or more packet data network connections to generate the transfer history database by recording at least a most recent transfer of the one or more packet data network connections in the transfer history database.

In Example 82, the subject matter of Example 71 can optionally include wherein the connection management circuit is configured to selectively block the available transfer between the first modem and the second modem by blocking the available transfer if a predefined time period has not passed since a most recent transfer of the one or more packet data network connections.

In Example 83, the subject matter of any one of Examples 71 to 82 can optionally include wherein the connection management circuit is configured to identify the available transfer of the target packet data network connection between the first modem and the second modem by evaluating radio measurements of the cellular wide area radio access or radio measurements of the short range radio access, and identifying the available transfer based on whether the radio measurements of the cellular wide area radio access or the radio measurements of the short range radio access satisfy predetermined transfer criteria.

In Example 84, the subject matter of Example 83 can optionally include wherein the predetermined transfer criteria include signal power thresholds or signal quality thresholds.

In Example 85, the subject matter of Example 83 can optionally include wherein the first modem is configured to perform the radio measurements of the cellular wide area radio access and the second modem is configured to perform the radio measurements of the short range radio access.

In Example 86, the subject matter of any one of Examples 71 to 85 can optionally include wherein the connection management circuit is configured to identify the available transfer of the target packet data network connection between the first modem and the second modem by evaluating the cellular wide area radio access and the short range radio access to determine whether radio access transfers are available, and selecting the target packet data network connection from the one or more packet data network connections if radio access transfers are available.

In Example 87, the subject matter of Example 86 can optionally include wherein the connection management circuit is configured to evaluate the cellular wide area radio access and the short range radio access to determine whether radio access transfers are available by comparing radio measurements of the cellular wide area radio access or radio measurements of the short range radio access to radio signal thresholds.

In Example 88, the subject matter of any one of Examples 71 to 87 can optionally include wherein the available transfer of the target packet data network connection is a radio access transfer of the target packet data network connection from the cellular wide area radio access of the first modem to the short range radio access of the second modem.

In Example 89, the subject matter of any one of Examples 71 to 87 can optionally include wherein the available transfer of the target packet data network connection is a radio access transfer of the target packet data network connection from the short range radio access of the second modem to the cellular wide area radio access of the first modem.

In Example 90, the subject matter of Example 71 can optionally include wherein the connection management circuit is further configured to identify a quantity of recent transfers of the one or more packet data network connections between the first modem and the second modem in the transfer history database, and wherein the connection management circuit is configured to selectively block the available transfer between the first modem and the second modem by blocking the available transfer if the quantity of recent transfers exceeds a predefined transfer count threshold.

In Example 91, the subject matter of Example 90 can optionally include wherein the connection management circuit is further configured to permit the available transfer if the quantity of recent transfers does not exceed the predefined transfer count threshold.

In Example 92, the subject matter of Example 90 or 91 can optionally include wherein the connection management circuit is configured to identify the quantity of recent transfers of the one or more packet data network connection between the first modem and the second modem from the transfer history database by identifying one or more transfers included in the transfer history database that occur in a predefined time window as the quantity of recent transfers.

In Example 93, the subject matter of any one of Examples 71 to 92 can optionally include wherein the connection management circuit is further configured to selectively block the available transfer further based on at least one of a user activity level of the target packet data network connection, a connection type of the target packet data network connection, radio measurements of the cellular wide area radio access, radio measurements of the short range radio access, or a battery level.

In Example 94, the subject matter of any one of Examples 71 to 92 can optionally include wherein the connection management circuit is further configured to selectively block the available transfer based on a user activity level of the target packet data network connection.

In Example 95, the subject matter of Example 94 can optionally include wherein the connection management circuit is configured to selectively block the available transfer based on the user activity level of the target packet data network connection by blocking the available transfer if the user activity level of the target packet data network connection is less than a predefined activity level threshold.

In Example 96, the subject matter of Example 94 can optionally include wherein the connection management circuit is configured to selectively block the available transfer based on the user activity level of the target packet data network connection by permitting the available transfer if the user activity level of the target packet data network connection is greater than a predefined activity level threshold.

In Example 97, the subject matter of Example 95 or 96 can optionally include wherein the predefined activity level threshold is a data bandwidth threshold or a data throughput threshold.

In Example 98, the subject matter of any one of Examples 71 to 92 can optionally include wherein the connection management circuit is further configured to selectively block the available transfer based on a connection type of the target packet data connection.

In Example 99, the subject matter of Example 98 can optionally include wherein the connection management circuit is configured to selectively block the available transfer based on the connection type of the target packet data network connection by blocking the available transfer if the connection type of the target packet data network connection is a first connection type, and permitting the available transfer if the connection type of the target packet data network connection is a second connection type.

In Example 100, the subject matter of Example 99 can optionally include wherein the first connection type is a voice data connection or a video data connection.

In Example 101, the subject matter of Example 99 or 100 can optionally include wherein the first connection type is an IP Multimedia Subsystem (IMS) connection.

In Example 102, the subject matter of any one of Examples 99 to 101 can optionally include wherein the second connection type is a bursty data traffic connection.

In Example 103, the subject matter of any one of Examples 99 to 102 can optionally include wherein the second connection type is an Internet or Web data connection.

In Example 104, the subject matter of any one of Examples 71 to 92 can optionally include wherein the connection management circuit is further configured to selectively block the available transfer based on a battery level.

In Example 105, the subject matter of any one of Examples 71 to 92 can optionally include wherein the connection management circuit is configured to block the available transfer if a battery level is below a predefined battery level threshold, and permit the available transfer if the battery level is above the predefined battery level threshold.

In Example 106, the subject matter of any one of Examples 71 to 105 can optionally include wherein the cellular wide area radio access is a $3^{rd}$ Generation Partnership Project (3GPP) radio access and the short range radio access is a Wireless Local Area Network (WLAN) radio access.

In Example 107, the subject matter of any one of Examples 71 to 105 can optionally include wherein the cellular wide area radio access is a Long Term Evolution (LTE) radio access and the short range radio access is a Wireless Local Area Network (WLAN) radio access.

In Example 108, the subject matter of any one of Examples 71 to 105 can optionally include wherein the cellular wide area radio access is a 3GPP network cell and the short range radio access is a WLAN Access Point (AP).

Example 109 is a mobile communication device for transmitting and receiving communication signals, the mobile communication device including a first modem configured to transmit and receive radio signals on a cellular wide area radio access, a second modem configured to transmit and receive radio signals on a short range radio access, and a connection management circuit configured to monitor radio access transfers of one or more packet data network connections to generate a transfer history database, determine from the transfer history database if more than a predefined quantity of previous transfers between the cellular wide area radio access and the short range radio access occur in a predefined time period, identify an available transfer of a target packet data network connection of the one or more packet data network connections between a cellular wide area radio access and a short range radio access, block the available transfer if more than a predefined quantity of radio access transfers between the first modem and the second modem occur in a predefined time period according to the transfer history database, and permit the available transfer if less than the predefined quantity of radio access transfers between the first modem and the second modem occur in the predefined time period according to the transfer history database.

In Example 110, the subject matter of Example 109 can optionally include wherein the connection management circuit is configured to interact with the first modem and the second modem to block or permit radio access transfers between the first modem and the second modem.

In Example 111, the subject matter of Example 109 or 110 can optionally include wherein the connection management circuit is configured to monitor radio access transfers of the one or more packet data network connections to generate the transfer history database by monitoring successful radio access of the one or more packet data network connections between the first modem and the second modem to include in the transfer history database.

In Example 112, the subject matter of any one of Examples 109 to 111 can optionally include wherein the connection management circuit is configured to monitor radio access transfers of the one or more packet data network connections to generate the transfer history database by recording an origin access point, an end access point, and a transfer time in the transfer history database for each monitored radio access transfer.

In Example 113, the subject matter of Example 112 can optionally include wherein the connection management circuit is configured to determine from the transfer history database if more than the predefined quantity of previous transfers between the cellular wide area radio access and the short range radio access occur in a predefined time period by determining whether more than the predefined quantity of transfers between the first modem and the second modem occur in the predefined time period according to the origin access points, end access points, and transfer times of the transfer history database.

In Example 114, the subject matter of Example 112 or 113 can optionally include wherein the connection management circuit is configured to record the origin access point, the end access point, and the transfer time in the transfer history database for each monitored radio access transfer by recording identity information of the origin access point and identity information of the end access point.

In Example 115, the subject matter of Example 114 can optionally include wherein the identity information of the origin access point and the identity information of the end access point include at least one of a cell identity, Physical Cell Identity (PCI), Media Access Control (MAC) address, or a Basic Service Set Identifier (BSSID) address.

In Example 116, the subject matter of any one of Examples 109 to 115 can optionally include wherein the connection management circuit is configured to monitor radio access transfers of the one or more packet data network connections to generate the transfer history database by recording at least a most recent transfer of the one or more packet data network connections in the transfer history database.

In Example 117, the subject matter of Example 109 can optionally include wherein the connection management circuit is configured to block the available transfer if more than the predefined quantity of radio access transfers between the first modem and the second modem occur in the predefined time period according to the transfer history database by blocking the available transfer if the predefined time period has not passed since a most recent transfer of the one or more packet data network connections.

In Example 118, the subject matter of any one of Examples 109 to 117 can optionally include wherein the connection management circuit is configured to identify the available transfer of the target packet data network connection between the first modem and the second modem by evaluating radio measurements of the cellular wide area radio access or radio measurements of the short range radio access, and identifying the available transfer based on whether the radio measurements of the cellular wide area radio access or the radio measurements of the short range radio access satisfy predetermined transfer criteria.

In Example 119, the subject matter of Example 118 can optionally include wherein the predetermined transfer criteria include signal power thresholds or signal quality thresholds.

In Example 120, the subject matter of Example 118 or 119 can optionally include wherein the first modem is configured to perform the radio measurements of the cellular wide area radio access and the second modem is configured to perform the radio measurements of the short range radio access.

In Example 121, the subject matter of any one of Examples 109 to 117 can optionally include wherein the connection management circuit is configured to identify the available transfer of the target packet data network connection between the first modem and the second modem by evaluating the cellular wide area radio access and the short range radio access to determine whether radio access transfers are available, and selecting the target packet data connection from the one or more packet data network connections if radio access transfers are available.

In Example 122, the subject matter of Example 121 can optionally include wherein the connection management circuit is configured to evaluate the cellular wide area radio access and the short range radio access to determine whether radio access transfers are available by comparing radio measurements of the cellular wide area radio access or radio measurements of the short range radio access to radio signal thresholds.

In Example 123, the subject matter of any one of Examples 109 to 122 can optionally include wherein the available transfer of the target packet data network is a radio access transfer of the target packet data network from the cellular wide area radio access of the first modem to the short range radio access of the second modem.

In Example 124, the subject matter of any one of Examples 109 to 122 can optionally include wherein the available transfer of the target packet data network is a radio access transfer of the target packet data network from the short range radio access of the second modem to the cellular wide area radio access of the first modem.

In Example 125, the subject matter of Example 109 can optionally include wherein the connection management circuit is further configured to identify one or more radio access transfers from the transfer history database that occur in the predefined time period, and wherein the connection management circuit is configured to block the available transfer if more than the predefined quantity of transfers between the first modem and the second modem occur in the predefined time period according to the transfer history database by determining whether the number of one or more radio access transfers exceeds a predefined transfer count threshold.

In Example 126, the subject matter of any one of Examples 109 to 125 can optionally include wherein the connection management circuit is further configured to block the available transfer further based on at least one of a user activity level of the target packet data network connection, a connection type of the target packet data network connection, radio measurements of the cellular wide area radio access, radio measurements of the short range radio access, or a battery level.

In Example 127, the subject matter of any one of Examples 109 to 125 can optionally include wherein the connection management circuit is configured to block the available transfer if more than the predefined quantity of radio access transfers between the first modem and the second modem occur in the predefined time period according to the transfer history database by blocking the available transfer based on a user activity level of the target packet data connection.

In Example 128, the subject matter of Example 127 can optionally include wherein the connection management circuit is configured to block the available transfer based on the user activity level of the target packet data connection by blocking the available transfer if the user activity level of the target packet data network connection is less than a predefined activity level threshold, and permitting the available transfer if the user activity level of the target packet data connection is greater than the predefined activity level threshold.

In Example 129, the subject matter of Example 128 can optionally include wherein the predefined activity level threshold is a data bandwidth threshold or a data throughput threshold.

In Example 130, the subject matter of any one of Examples 109 to 125 can optionally include wherein the connection management circuit is configured to block the available transfer based on a connection type of the target packet data network connection.

In Example 131, the subject matter of any one of Examples 109 to 125 can optionally include wherein the connection management circuit is configured to block the available transfer if a connection type of the target packet data network connection is a first connection type, and permit the available transfer if the connection type of the target packet data network connection is a second connection type.

In Example 132, the subject matter of Example 131 can optionally include wherein the first connection type is a voice data connection or a video data connection.

In Example 133, the subject matter of Example 131 or 132 can optionally include wherein the first connection type is an IP Multimedia Subsystem (IMS) connection.

In Example 134, the subject matter of any one of Examples 131 to 133 can optionally include wherein the second connection type is a bursty data traffic connection.

In Example 135, the subject matter of any one of Examples 131 to 134 can optionally include wherein the second connection type is an Internet or Web data connection.

In Example 136, the subject matter of any one of Examples 109 to 125 can optionally include wherein the connection management circuit is configured to block the available transfer based on a battery level.

In Example 137, the subject matter of any one of Examples 109 to 125 can optionally include wherein the connection management circuit is configured to block the available transfer if a battery level is below a predefined battery level threshold, and permit the available transfer if the battery level is above the predefined battery level threshold.

In Example 138, the subject matter of any one of Examples 109 to 137 can optionally include wherein the wherein the cellular wide area radio access is a $3^{rd}$ Generation Partnership Project (3GPP) radio access and the short range radio access is a Wireless Local Area Network (WLAN) radio access.

In Example 139, the subject matter of any one of Examples 109 to 137 can optionally include wherein the cellular wide area radio access is a Long Term Evolution (LTE) radio access and the short range radio access is a Wireless Local Area Network (WLAN) radio access.

In Example 140, the subject matter of any one of Examples 109 to 137 can optionally include wherein the cellular wide area radio access is a 3GPP network cell and the short range radio access is a WLAN Access Point (AP).

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication device for transmitting and receiving communication signals, the mobile communication device comprising:
   a first modem configured to transmit and receive radio signals on a cellular wide area radio access;
   a second modem configured to transmit and receive radio signals on a short range radio access; and
   a connection management circuit configured to:
   monitor radio access transfers of one or more packet data network connections to generate a transfer history database;
   determine from the transfer history database if excessive previous transfers of the one or more packet data network connections occur between the cellular wide area radio access and the short range radio access;
   identify an available transfer of a target packet data network connection of the one or more packet data network connections between the first modem and the second modem; and
   selectively block the available transfer between the first modem and the second modem based on if excessive previous transfers of the one or more packet data network connections occur between the first modem and the second modem.

2. The mobile communication device of claim 1, wherein the connection management circuit is configured to selectively block the available transfer between the first modem and the second modem by:
   blocking the available transfer if excessive previous transfers of the one or more packet data network connections occur; and
   permitting the available transfer if excessive previous transfers of the one or more packet data network connections do not occur.

3. The mobile communication device of claim 1, wherein the connection management circuit is configured to selectively block the available transfer between the first modem and second modem by:
   blocking the available transfer if more than a predefined quantity of transfers between the first modem and the second modem occur in a predefined time period according to the transfer history database.

4. The mobile communication device of claim 1, wherein connection management circuit is configured to monitor radio access transfers of the one or more packet data network connections to generate the transfer history database by:
   recording an origin access point, an end access point, and a transfer time in the transfer history database for each monitored radio access transfer.

5. The mobile communication device of claim 1, wherein the connection management circuit is configured to selectively block the available transfer between the first modem and the second modem by:
   blocking the available transfer if a predefined time period has not passed since a most recent transfer of the one or more packet data network connections.

6. The mobile communication device of claim 1, wherein the connection management circuit is configured to identify the available transfer of the target packet data network connection between the first modem and the second modem by:
   evaluating radio measurements of the cellular wide area radio access or radio measurements of the short range radio access; and
   identifying the available transfer based on whether the radio measurements of the cellular wide area radio access or the radio measurements of the short range radio access satisfy predetermined transfer criteria.

7. The mobile communication device of claim 1, wherein the available transfer of the target packet data network connection is a radio access transfer of the target packet data network connection from the cellular wide area radio access of the first modem to the short range radio access of the second modem.

8. The mobile communication device of claim 1, wherein the available transfer of the target packet data network connection is a radio access transfer of the target packet data network connection from the short range radio access of the second modem to the cellular wide area radio access of the first modem.

9. The mobile communication device of claim 1, wherein the connection management circuit is further configured to selectively block the available transfer based on a user activity level of the target packet data network connection.

10. The mobile communication device of claim 1, wherein the connection management circuit is further configured to selectively block the available transfer based on a connection type of the target packet data connection.

11. The mobile communication device of claim 1, wherein the cellular wide area radio access is a $3^{rd}$ Generation Partnership Project (3GPP) radio access and the short range radio access is a Wireless Local Area Network (WLAN) radio access.

12. A mobile communication device for transmitting and receiving communication signals, the mobile communication device comprising:
   a first modem configured to transmit and receive radio signals on a cellular wide area radio access;
   a second modem configured to transmit and receive radio signals on a short range radio access; and
   a connection management circuit configured to:
   monitor radio access transfers of one or more packet data network connections to generate a transfer history database;
   determine from the transfer history database if more than a predefined quantity of previous transfers between the cellular wide area radio access and the short range radio access occur in a predefined time period;

identify an available transfer of a target packet data network connection of the one or more packet data network connections between a cellular wide area radio access and a short range radio access;

block the available transfer if more than a predefined quantity of previous transfers between the first modem and the second modem occur in a predefined time period according to the transfer history database; and permit the available transfer if less than the predefined quantity of previous transfers between the first modem and the second modem occur in the predefined time period according to the transfer history database.

13. The mobile communication device of claim 12, wherein the connection management circuit is configured to monitor radio access transfers of the one or more packet data network connections to generate the transfer history database by:

recording an origin access point, an end access point, and a transfer time in the transfer history database for each monitored radio access transfer.

14. The mobile communication device of claim 12, wherein the connection management circuit is configured to block the available transfer if more than the predefined quantity of previous transfers between the first modem and the second modem occur in the predefined time period according to the transfer history database by:

blocking the available transfer if the predefined time period has not passed since a most recent transfer of the one or more packet data network connections.

15. The mobile communication device of claim 12, wherein the connection management circuit is configured to block the available transfer if more than the predefined quantity of previous transfers between the first modem and the second modem occur in the predefined time period according to the transfer history database by:

blocking the available transfer based on a user activity level of the target packet data connection.

16. The mobile communication device of claim 12, wherein the cellular wide area radio access is a $3^{rd}$ Generation Partnership Project (3GPP) radio access and the short range radio access is a Wireless Local Area Network (WLAN) radio access.

17. A method for managing packet data network connections, the method comprising:

monitoring radio access transfers of one or more packet data network connections to generate a transfer history database;

determining from the transfer history database if excessive previous transfers of the one or more packet data network connections occur between a cellular wide area radio access and a short range radio access;

identifying an available transfer of a target packet data network connection of the one or more packet data network connections between the cellular wide area radio access and the short range radio access; and selectively blocking the available transfer between the cellular wide area radio access and the short range radio access if excessive previous transfers of the one or more packet data network connections occur between the cellular wide area radio access and the short range radio access.

18. The method of claim 17, wherein selectively blocking the available transfer between the cellular wide area radio access and the short range radio access comprises:

blocking the available transfer if excessive previous transfers of the one or more packet data network connections occur; and permitting the available transfer if excessive previous transfers of the one or more packet data network connections do not occur.

19. The method of claim 17, wherein selectively blocking the available transfer between the cellular wide area radio access and the short range radio access comprises:

blocking the available transfer if more than a predefined quantity of previous transfers between the cellular wide area radio access and the short range radio access occur in a predefined time period.

20. The method of claim 17, wherein the cellular wide area radio access is a $3^{rd}$ Generation Partnership Project (3GPP) radio access and the short range radio access is a Wireless Local Area Network (WLAN) radio access.

* * * * *